US012619656B2

(12) United States Patent
Arokiasamy et al.

(10) Patent No.: US 12,619,656 B2
(45) Date of Patent: May 5, 2026

(54) AUTOMATED TOOL FOR DETERMINING AND PROVIDING INFORMATION ABOUT DWELLINGS SATISFYING SEARCH CRITERIA SPECIFIED USING MULTIPLE DATA MODES

(71) Applicant: MFTB Holdco, Inc., Seattle, WA (US)

(72) Inventors: Hubert Vijay Arokiasamy, Union City, CA (US); Dushyant R. Maheshwary, Seattle, WA (US); Piali Syam, Newark, CA (US); Alexey Serba, Pleasanton, CA (US); Sandesh Satish, Seattle, WA (US); Ashwani Kapoor, Union City, CA (US); Supriya Anand, San Francisco, CA (US); Jyoti Prakash Maheswari, Irving, TX (US); Rajendra Waman Shioramwar, San Ramon, CA (US)

(73) Assignee: MFTB Holdco, Inc., Seattle, WA (US)

( * ) Notice: Subject to any disclaimer, the term of this patent is extended or adjusted under 35 U.S.C. 154(b) by 0 days.

(21) Appl. No.: 18/734,815

(22) Filed: Jun. 5, 2024

(65) Prior Publication Data

US 2025/0378113 A1 Dec. 11, 2025

(51) Int. Cl.
*G06F 16/00* (2019.01)
*G06F 16/535* (2019.01)
(Continued)

(52) U.S. Cl.
CPC ............ *G06F 16/56* (2019.01); *G06F 16/535* (2019.01); *G06F 16/538* (2019.01)

(58) Field of Classification Search
None
See application file for complete search history.

(56) References Cited

U.S. PATENT DOCUMENTS

| | | | | |
|---|---|---|---|---|
| 11,809,508 B1 * | 11/2023 | Kallman | ............. | G06F 16/9537 |
| 2025/0005810 A1 * | 1/2025 | Sadalgi | ................. | G06F 3/0485 |
| 2025/0231975 A1 * | 7/2025 | DeGroot | ................. | G06N 5/02 |

FOREIGN PATENT DOCUMENTS

WO 2023248204 A1 12/2023

OTHER PUBLICATIONS

"Zillow's new AI-powered natural-language search is a first in real estate", Jan. 26, 2023, retrieved on Nov. 22, 2023 from https://investors.zillowgroup.com/investors/news-and-events/news/news-details/2023/Zillows-new-AI-powered-natural-language-search-is-a-first-in-real-estate/default.aspx, 2 pages.

(Continued)

*Primary Examiner* — Bai D Vu
(74) *Attorney, Agent, or Firm* — VLP Law Group LLP; James A. D. White

(57) ABSTRACT

Techniques are described for performing automated operations related to determining and providing information about dwellings for searches with search criteria combining data of multiple modes, such as at least free-form natural language text and one or more images. In some situations, the described techniques include training machine learning ("ML") model(s) to encode semantic information about dwellings from multiple data modes into corresponding vector-based embeddings, using the trained ML model(s) to generate vector embeddings for dwellings in one or more geographical areas to represent dwelling data of multiple data modes, using the trained ML model(s) to generate vector embeddings for a search query with multiple search criteria including data of multiple modes, and determining one or more matching target dwellings for the query by matching generated vector embeddings of candidate dwellings to the generated vector embedding(s) for the query, with (Continued)

information about matching target dwelling(s) then further used.

26 Claims, 13 Drawing Sheets

(51) Int. Cl.
  *G06F 16/538*     (2019.01)
  *G06F 16/56*      (2019.01)

(56)              References Cited

OTHER PUBLICATIONS

"Zillow builds ChatGPT plugin for real estate searches", May 2, 2023, retrieved on Dec. 18, 2023 from https://investors.zillowgroup.com/investors/news-and-events/news/news-details/2023/Zillow-builds-ChatGPT-plugin-for-real-estate-searches/default.aspx, 2 pages.

Homesnapblog, "New: Draw Your Own Search Area To Look For Homes", May 24, 2018, retrieved on Nov. 22, 2023 from https://blog.homesnap.com/homesnap-draw-your-own-search-area-homes/, 8 pages.

"Zillow home-search tools that can help you search multiple locations— or draw your own search map", Feb. 26, 2013, retrieved on Nov. 22, 2023 from https://www.zillowgroup.com/news/new-draw-your-own-search-on-zillow-com/, 4 pages.

Brian Carmody, "The 7 Best Real Estate Websites of 2024", Dec. 13, 2023, retrieved on Jan. 5, 2024 from https://www.investopedia.com/best-real-estate-websites-5069964, 19 pages.

Matt G. Southern, "Google Maps Makes It Easier To Find Restaurants And Bars", Jun. 27, 2018, retrieved on Jan. 5, 2024 from https://www.searchenginejournal.com/google-maps-makes-it-easier-to-find-restaurants-and-bars/258949/, 3 pages.

"How Google Uses Location Information—Privacy & Terms", retrieved on Jan. 13, 2024 from https://policies.google.com/technologies/location-data, 13 pages.

Erwin van Holten, "How To Find Restaurants Other Than My Location", Mar. 6, 2023, retrieved on Jan. 5, 2024 from https://support.google.com/maps/thread/204943052/how-to-find-restaurants-other-than-my-location?hl=en, 5 pages.

"Searching For Homes—Redfin Customer Service", retrieved on Jan. 11, 2024 from https://support.redfin.com/hc/en-us/articles/360001432632-Searching-for-Homes, 11 pages.

Sarah Lentz, "Zillow And Redfin Announce ChatGPT Plugins To Change The Way People Search For Homes", May 4, 2023, retrieved on Jan. 13, 2024 from https://nowbam.com/zillow-and-redfin-announce-chatgpt-plugins-to-change-the-way-people-search-for-homes/, 5 pages.

* cited by examiner

Fig. 1B

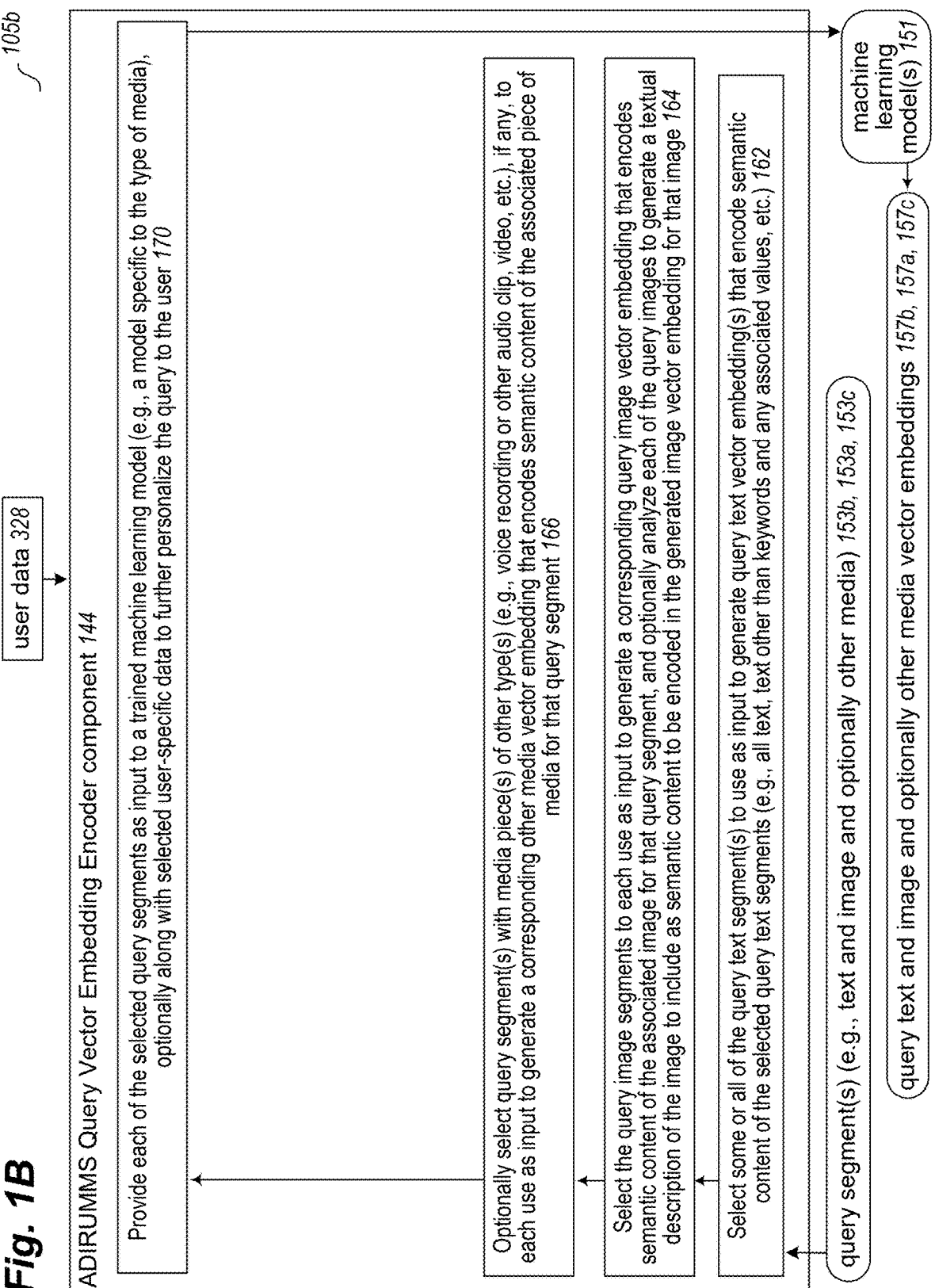

105b

ADiRUMMS Query Vector Embedding Encoder component 144

Provide each of the selected query segments as input to a trained machine learning model (e.g., a model specific to the type of media), optionally along with selected user-specific data to further personalize the query to the user 170

Optionally select query segment(s) with media piece(s) of other type(s) (e.g., voice recording or other audio clip, video, etc.), if any, to each use as input to generate a corresponding other media vector embedding that encodes semantic content of the associated piece of media for that query segment 166

Select the query image segments to each use as input to generate a corresponding query image vector embedding that encodes semantic content of the associated image for that query segment, and optionally analyze each of the query images to generate a textual description of the image to include as semantic content to be encoded in the generated image vector embedding for that image 164

Select some or all of the query text segment(s) to use as input to generate query text vector embedding(s) that encode semantic content of the selected query text segments (e.g., all text, text other than keywords and any associated values, etc.) 162 query segment(s) (e.g., text and image and optionally other media) 153b, 153a, 153c query text and image and optionally other media vector embeddings 157b, 157a, 157c machine learning model(s) 151 user data 328

Fig. 1C

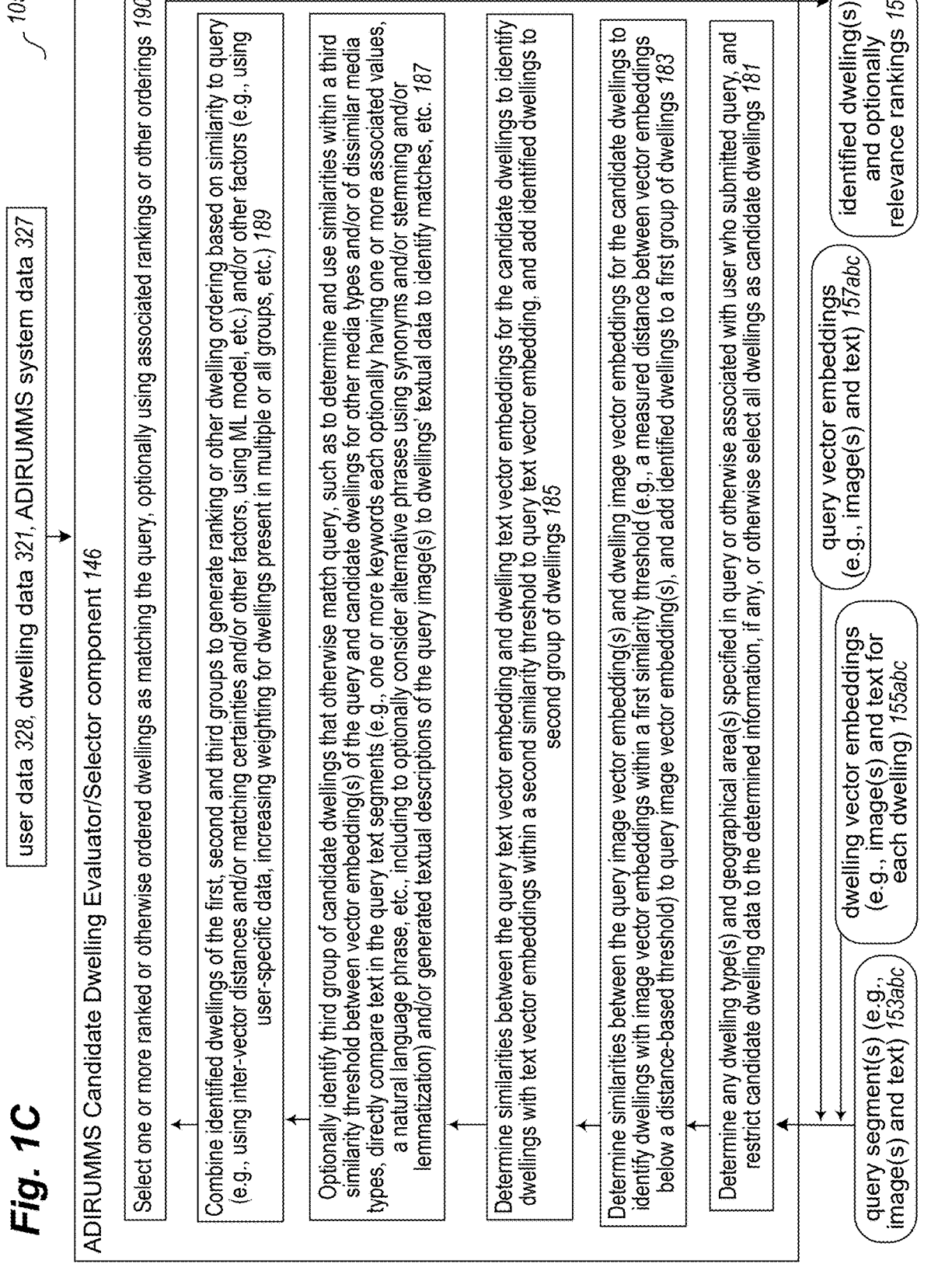

ADIRUMMS Candidate Dwelling Evaluator/Selector component *146* user data *328*, dwelling data *321*, ADIRUMMS system data *327*

Select one or more ranked or otherwise ordered dwellings as matching the query, optionally using associated rankings or other orderings *190*

Combine identified dwellings of the first, second and third groups to generate ranking or other dwelling ordering based on similarity to query (e.g., using inter-vector distances and/or matching certainties and/or other factors, using ML model, etc.) and/or other factors (e.g., using user-specific data, increasing weighting for dwellings present in multiple or all groups, etc.) *189*

Optionally identify third group of candidate dwellings that otherwise match query, such as to determine and use similarities within a third similarity threshold between vector embedding(s) of the query and candidate dwellings for other media types and/or of dissimilar media types, directly compare text in the query text segments (e.g., one or more keywords each optionally having one or more associated values, a natural language phrase, etc., including to optionally consider alternative phrases using synonyms and/or stemming and/or lemmatization) and/or generated textual descriptions of the query image(s) to dwellings' textual data to identify matches, etc. *187*

Determine similarities between the query text vector embedding and dwelling text vector embeddings for the candidate dwellings to identify dwellings with text vector embeddings within a second similarity threshold to query text vector embedding, and add identified dwellings to second group of dwellings *185*

Determine similarities between the query image vector embedding(s) and dwelling image vector embeddings for the candidate dwellings to identify dwellings with image vector embeddings within a first similarity threshold (e.g., a measured distance between vector embeddings below a distance-based threshold) to query image vector embedding(s), and add identified dwellings to a first group of dwellings *183*

Determine any dwelling type(s) and geographical area(s) specified in query or otherwise associated with user who submitted query, and restrict candidate dwelling data to the determined information, if any, or otherwise select all dwellings as candidate dwellings *181* query segment(s) (e.g., image(s) and text) *153abc* dwelling vector embeddings (e.g., image(s) and text for each dwelling) *155abc* query vector embeddings (e.g., image(s) and text) *157abc* identified dwelling(s) and optionally relevance rankings *159*

Figure 1D:
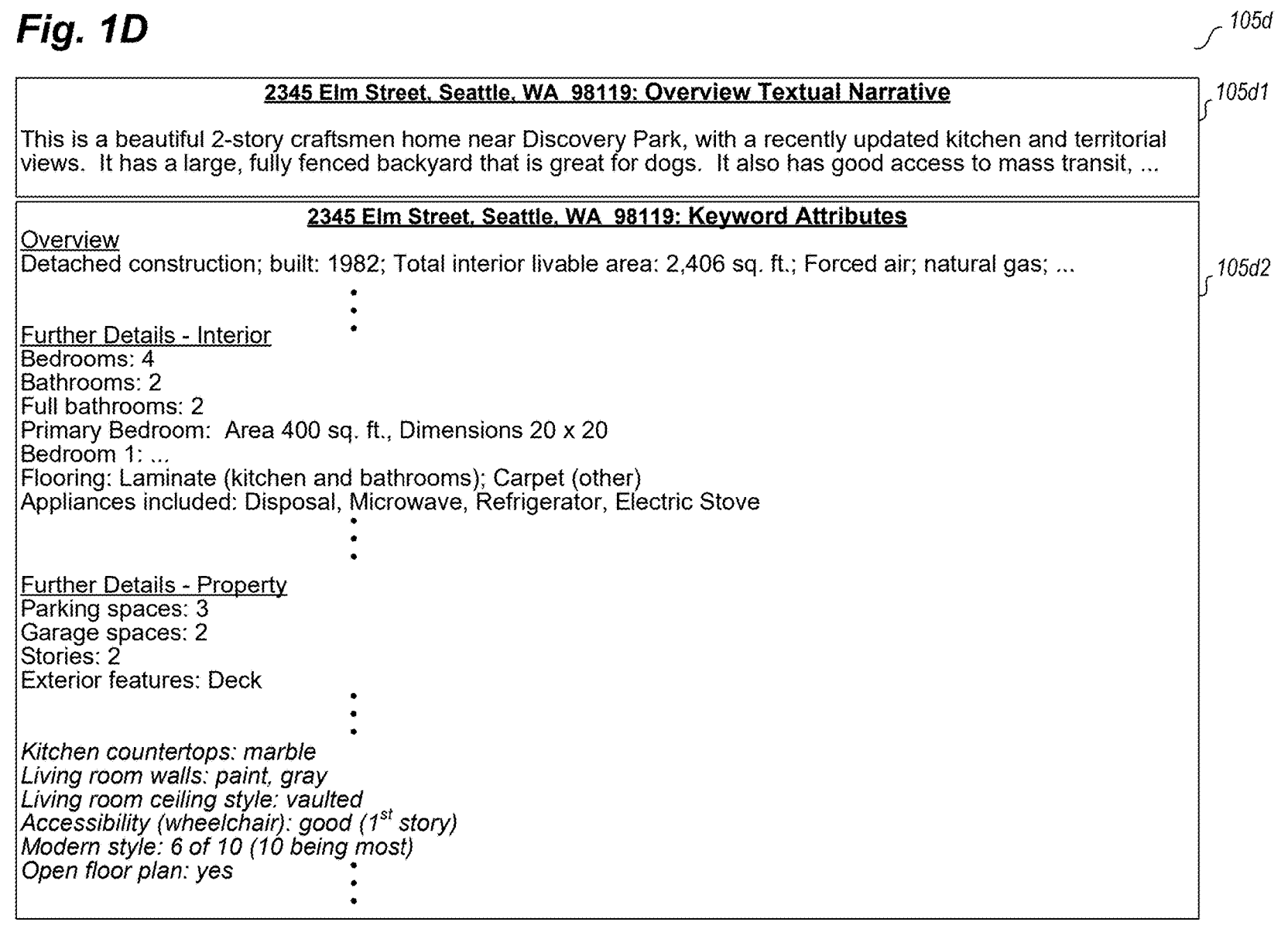

2345 Elm Street, Seattle, WA 98119: Overview Textual Narrative

This is a beautiful 2-story craftsmen home near Discovery Park, with a recently updated kitchen and territorial views. It has a large, fully fenced backyard that is great for dogs. It also has good access to mass transit, ...

_105d2_

2345 Elm Street, Seattle, WA 98119: Keyword Attributes

Overview
Detached construction; built: 1982; Total interior livable area: 2,406 sq. ft.; Forced air; natural gas; ...

. . .

Further Details - Interior
Bedrooms: 4
Bathrooms: 2
Full bathrooms: 2
Primary Bedroom: Area 400 sq. ft., Dimensions 20 x 20
Bedroom 1: ...
Flooring: Laminate (kitchen and bathrooms); Carpet (other)
Appliances included: Disposal, Microwave, Refrigerator, Electric Stove

. . .

Further Details - Property
Parking spaces: 3
Garage spaces: 2
Stories: 2
Exterior features: Deck

. . .

_Kitchen countertops: marble_
_Living room walls: paint, gray_
_Living room ceiling style: vaulted_
_Accessibility (wheelchair): good (1$^{st}$ story)_
_Modern style: 6 of 10 (10 being most)_
_Open floor plan: yes_

Fig. 2A     Example GUI and Interactions     ⌐ 205a

⌐ 360

⌐ 206

Enter a request in everyday language for dwellings of interest (e.g., houses, apartments, multi-family, etc.), and with similar images or other media

Example: "houses in Seattle near Lake Union     ⌐Sign In
with 3+ bedrooms and large fenced yards"  210a⌐ homes near Discovery Park with 3+ bedrooms 2 bathrooms

215a⌐  Results for Homes Near POI "Discovery Park" in Seattle  AND "3 or more     218a
          bedrooms" AND "2 bathrooms"  (not right? click here)

217a  1. 1234 Maple Street, Seattle WA 98119 - $XXX,XXX –
                                     3 bds, 2 ba, 2300 sq ft 2. 2345 Elm Street, Seattle WA 98119 - $XXX,XXX –
                                     4 bds, 2 ba, 2400 sq ft 3. 3456 Oak Street, Seattle WA 98119 - $XXX,XXX –
                                     3 bds, 2 ba, 2000 sq ft 4. 4567 Pine Street, Seattle WA 98119 - $XXX,XXX –
                                     3 bds, 2 ba, 1500 sq ft
                            ▪
215b⌐                       ▪                           ⌐216a
                            ▪ homes near Discovery Park with 3+
bedrooms and large fenced yard and looks like

220a

Results for Homes Near POI "Discovery Park" in Seattle AND "3 or more
bedrooms" AND "large fenced yard" AND like <image 216a>  (not right? click
here)

1. 2345 Elm Street, Seattle WA 98119 - $XXX,XXX –
                                     4 bds, 2 ba, 2400 sq ft 2. 5678 Birch Street, Seattle WA 98119 - $XXX,XXX –
                                     3 bds, 2 ba, 2350 sq ft 3. 6789 Chestnut Street, Seattle WA 98119 - $XXX,XXX –
                                     3 bds, 2 ba, 2000 sq ft
                            ▪
                            ▪
                            ▪                           220b ADIRUMMS system uses "homes" dwelling type segment and "near" indeterminate geographical distance segment and "Discovery Park" POI-based segment to consider homes in a defined geographical search region for Discovery Park in Seattle, with 2 keyword-based search criteria segments further used to identify matching houses (keyword "bedrooms" and associated value(s) "3", "4", ..., and keyword "bathrooms" and associated value "2")

similar to first search, but use additional non-keyword search criteria in additional phrase-based segment of "large fenced yard" and provide image 216a to use in identifying similar house exteriors (e.g., similar architectural styles), such as to generate query image embedding vector for image 216a and query text embedding vector for some or all of " homes near Discovery Park with 3+ bedrooms and large fenced yard"

Figure 2B:
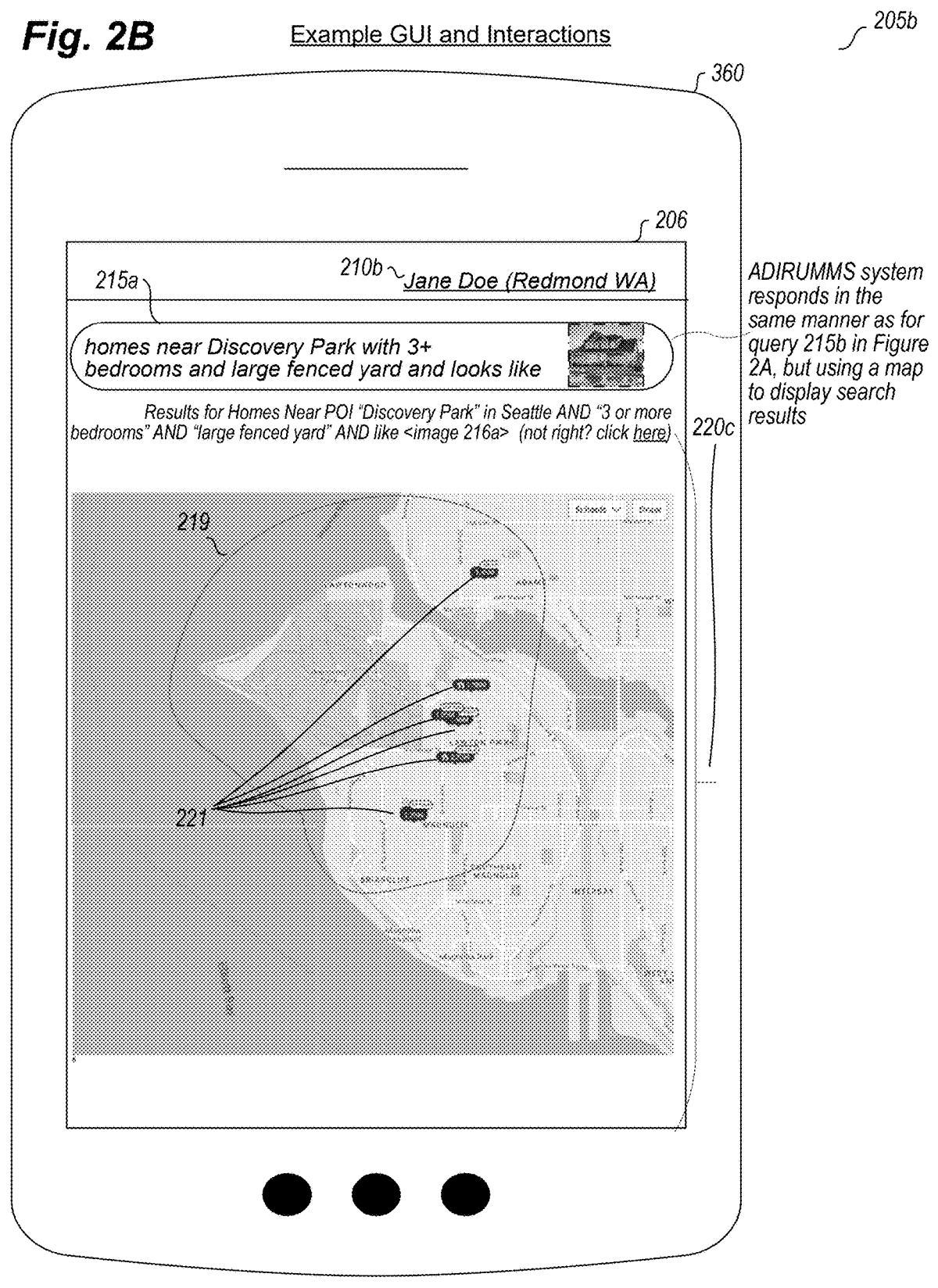

*Fig. 2B*     Example GUI and Interactions

*205b*

*360*

*206*

215a

210b — Jane Doe (Redmond WA)

homes near Discovery Park with 3+
bedrooms and large fenced yard and looks like

*Results for Homes Near POI "Discovery Park" in Seattle AND "3 or more
bedrooms" AND "large fenced yard" AND like <image 216a>  (not right? click here)*

220c

219

221

ADIRUMMS system
responds in the
same manner as for
query 215b in Figure
2A, but using a map
to display search
results

Figure 2C:
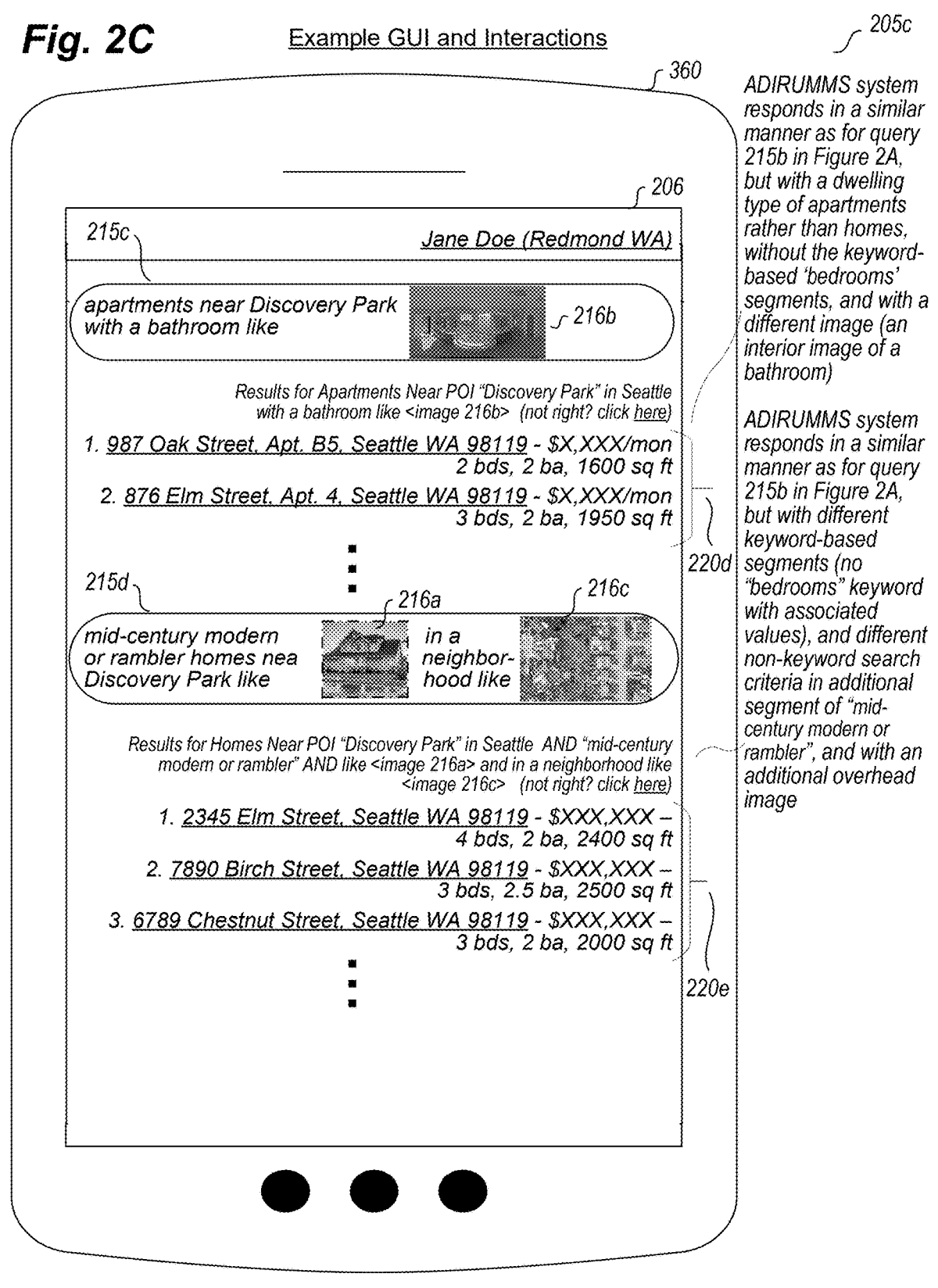

*Fig. 2C*     Example GUI and Interactions

ADIRUMMS system responds in a similar manner as for query 215b in Figure 2A, but with a dwelling type of apartments rather than homes, without the keyword-based 'bedrooms' segments, and with a different image (an interior image of a bathroom)

ADIRUMMS system responds in a similar manner as for query 215b in Figure 2A, but with different keyword-based segments (no "bedrooms" keyword with associated values), and different non-keyword search criteria in additional segment of "mid-century modern or rambler", and with an additional overhead image Jane Doe (Redmond WA)

apartments near Discovery Park with a bathroom like

Results for Apartments Near POI "Discovery Park" in Seattle with a bathroom like <image 216b>  (not right? click here)

1. 987 Oak Street, Apt. B5, Seattle WA 98119 - $X,XXX/mon
2 bds, 2 ba, 1600 sq ft 2. 876 Elm Street, Apt. 4, Seattle WA 98119 - $X,XXX/mon
3 bds, 2 ba, 1950 sq ft mid-century modern or rambler homes nea Discovery Park like     in a neighbor-hood like Results for Homes Near POI "Discovery Park" in Seattle  AND "mid-century modern or rambler" AND like <image 216a> and in a neighborhood like <image 216c>  (not right? click here)

1. 2345 Elm Street, Seattle WA 98119 - $XXX,XXX –
4 bds, 2 ba, 2400 sq ft 2. 7890 Birch Street, Seattle WA 98119 - $XXX,XXX –
3 bds, 2.5 ba, 2500 sq ft 3. 6789 Chestnut Street, Seattle WA 98119 - $XXX,XXX –
3 bds, 2 ba, 2000 sq ft

Fig. 4

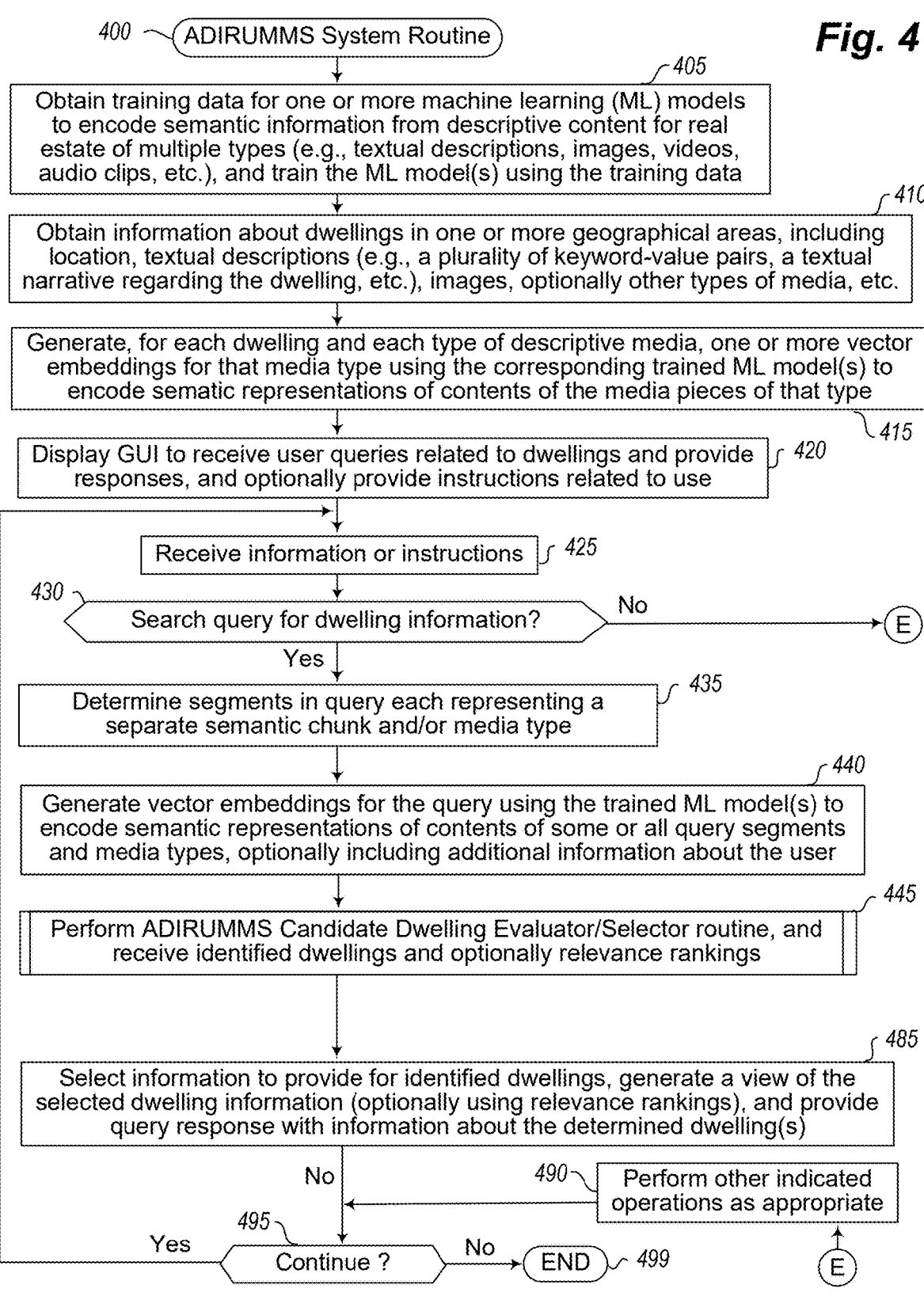

400 — ( ADIRUMMS System Routine )

*405*
Obtain training data for one or more machine learning (ML) models to encode semantic information from descriptive content for real estate of multiple types (e.g., textual descriptions, images, videos, audio clips, etc.), and train the ML model(s) using the training data

*410*
Obtain information about dwellings in one or more geographical areas, including location, textual descriptions (e.g., a plurality of keyword-value pairs, a textual narrative regarding the dwelling, etc.), images, optionally other types of media, etc.

Generate, for each dwelling and each type of descriptive media, one or more vector embeddings for that media type using the corresponding trained ML model(s) to encode sematic representations of contents of the media pieces of that type
*415*

Display GUI to receive user queries related to dwellings and provide responses, and optionally provide instructions related to use *420*

Receive information or instructions *425*

430 — Search query for dwelling information?      No →  (E)

Yes

*435*
Determine segments in query each representing a separate semantic chunk and/or media type

*440*
Generate vector embeddings for the query using the trained ML model(s) to encode semantic representations of contents of some or all query segments and media types, optionally including additional information about the user

*445*
Perform ADIRUMMS Candidate Dwelling Evaluator/Selector routine, and receive identified dwellings and optionally relevance rankings

*485*
Select information to provide for identified dwellings, generate a view of the selected dwelling information (optionally using relevance rankings), and provide query response with information about the determined dwelling(s)

No          490 — Perform other indicated operations as appropriate

495 —
Yes ← Continue ?   No → ( END ) — 499          (E)

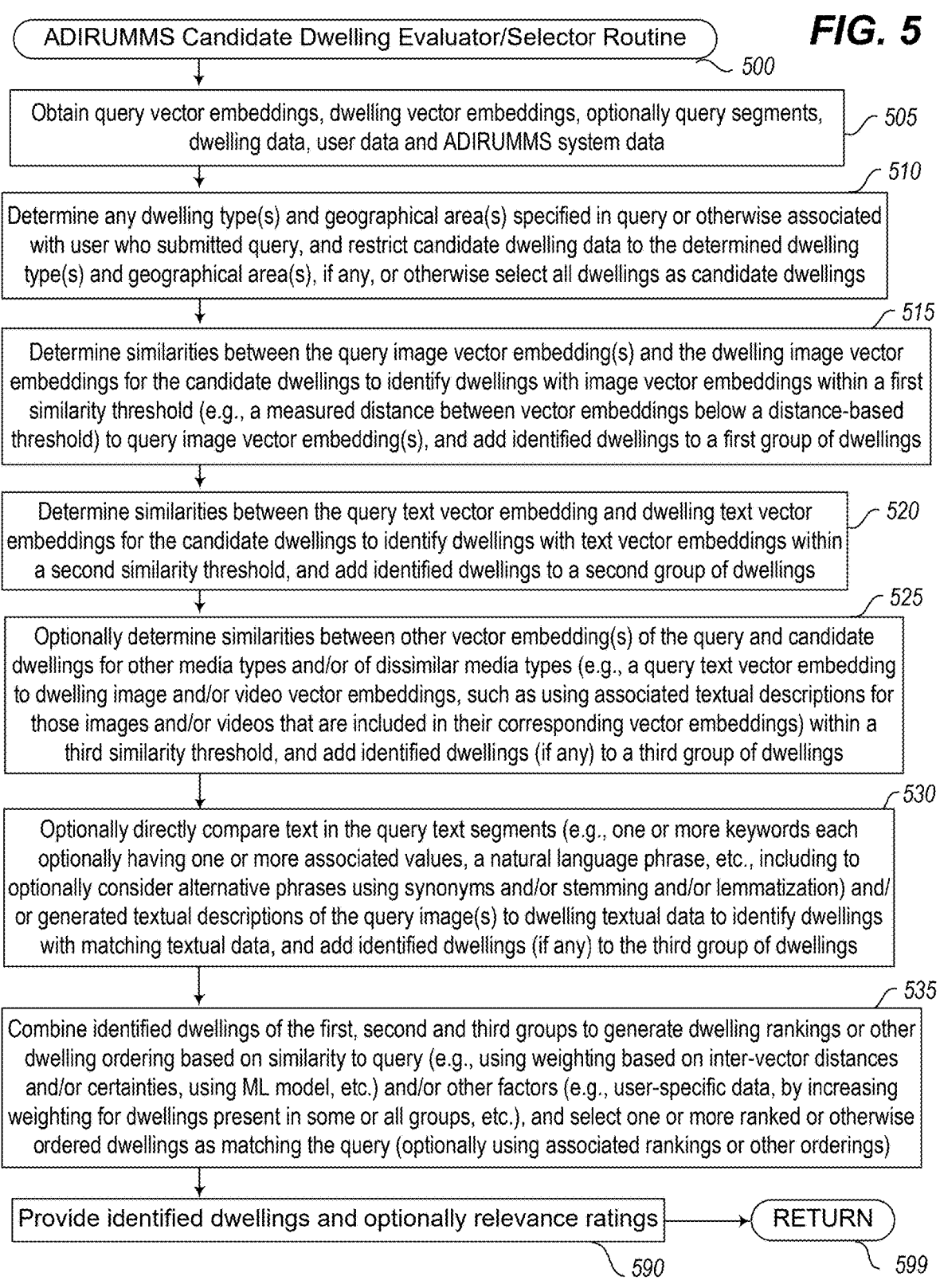

FIG. 5

ADIRUMMS Candidate Dwelling Evaluator/Selector Routine — 500

Obtain query vector embeddings, dwelling vector embeddings, optionally query segments, dwelling data, user data and ADIRUMMS system data — 505

Determine any dwelling type(s) and geographical area(s) specified in query or otherwise associated with user who submitted query, and restrict candidate dwelling data to the determined dwelling type(s) and geographical area(s), if any, or otherwise select all dwellings as candidate dwellings — 510

Determine similarities between the query image vector embedding(s) and the dwelling image vector embeddings for the candidate dwellings to identify dwellings with image vector embeddings within a first similarity threshold (e.g., a measured distance between vector embeddings below a distance-based threshold) to query image vector embedding(s), and add identified dwellings to a first group of dwellings — 515

Determine similarities between the query text vector embedding and dwelling text vector embeddings for the candidate dwellings to identify dwellings with text vector embeddings within a second similarity threshold, and add identified dwellings to a second group of dwellings — 520

Optionally determine similarities between other vector embedding(s) of the query and candidate dwellings for other media types and/or of dissimilar media types (e.g., a query text vector embedding to dwelling image and/or video vector embeddings, such as using associated textual descriptions for those images and/or videos that are included in their corresponding vector embeddings) within a third similarity threshold, and add identified dwellings (if any) to a third group of dwellings — 525

Optionally directly compare text in the query text segments (e.g., one or more keywords each optionally having one or more associated values, a natural language phrase, etc., including to optionally consider alternative phrases using synonyms and/or stemming and/or lemmatization) and/or generated textual descriptions of the query image(s) to dwelling textual data to identify dwellings with matching textual data, and add identified dwellings (if any) to the third group of dwellings — 530

Combine identified dwellings of the first, second and third groups to generate dwelling rankings or other dwelling ordering based on similarity to query (e.g., using weighting based on inter-vector distances and/or certainties, using ML model, etc.) and/or other factors (e.g., user-specific data, by increasing weighting for dwellings present in some or all groups, etc.), and select one or more ranked or otherwise ordered dwellings as matching the query (optionally using associated rankings or other orderings) — 535

Provide identified dwellings and optionally relevance ratings — 590 → RETURN — 599

AUTOMATED TOOL FOR DETERMINING AND PROVIDING INFORMATION ABOUT DWELLINGS SATISFYING SEARCH CRITERIA SPECIFIED USING MULTIPLE DATA MODES

TECHNICAL FIELD

The following disclosure relates generally to techniques for automatically determining and providing information about dwellings in response to search criteria specified using data of multiple modes, such as to automatically respond to a dwelling-related search query that has multiple modes of data including at least free-form natural language text and one or more images by generating and using encoded representations of semantic content of the data of the multiple data modes to identify matching dwellings.

BACKGROUND

An abundance of information is available to users on a wide variety of topics from a variety of sources. For example, portions of the World Wide Web ("the Web") are akin to an electronic library of documents and other data resources distributed over the Internet, with billions of documents available, including groups of documents directed to various specific topic areas (e.g., buildings of various types). In addition, various other information is available via other communication mediums. However, existing search engines and other techniques for identifying information of interest suffer from various problems. Non-exclusive examples include a difficulty in understanding natural language requests, difficulty in providing accurate information that is specific to a particular topic of interest, difficulty in limiting information requests to approved topics, etc.

BRIEF DESCRIPTION OF THE DRAWINGS

FIGS. 1A-1C are network diagrams illustrating an example system for performing described techniques, including automatically responding to a dwelling-related search query using multiple modes of data including at least free-form natural language text and one or more images by generating and using encoded representations of semantic content of the data of the multiple data modes to identify matching dwellings.

FIG. 1D illustrates examples of non-exclusive types of building description information.

FIGS. 2A-2E illustrate examples of performing described techniques, including automatically responding to dwelling-related search queries using multiple modes of data including at least free-form natural language text and one or more images by generating and using encoded representations of semantic content of the data of the multiple data modes to identify matching dwellings.

FIG. 4 illustrates a flow diagram of an example embodiment of an Automated Dwelling Information Retrieval Using Multi-Modal Search ("ADIRUMMS") system routine.

FIG. 5 illustrates a flow diagram of an example embodiment of an ADIRUMMS Candidate Dwelling Evaluator/Selector component routine.

DETAILED DESCRIPTION

Figure 1A:
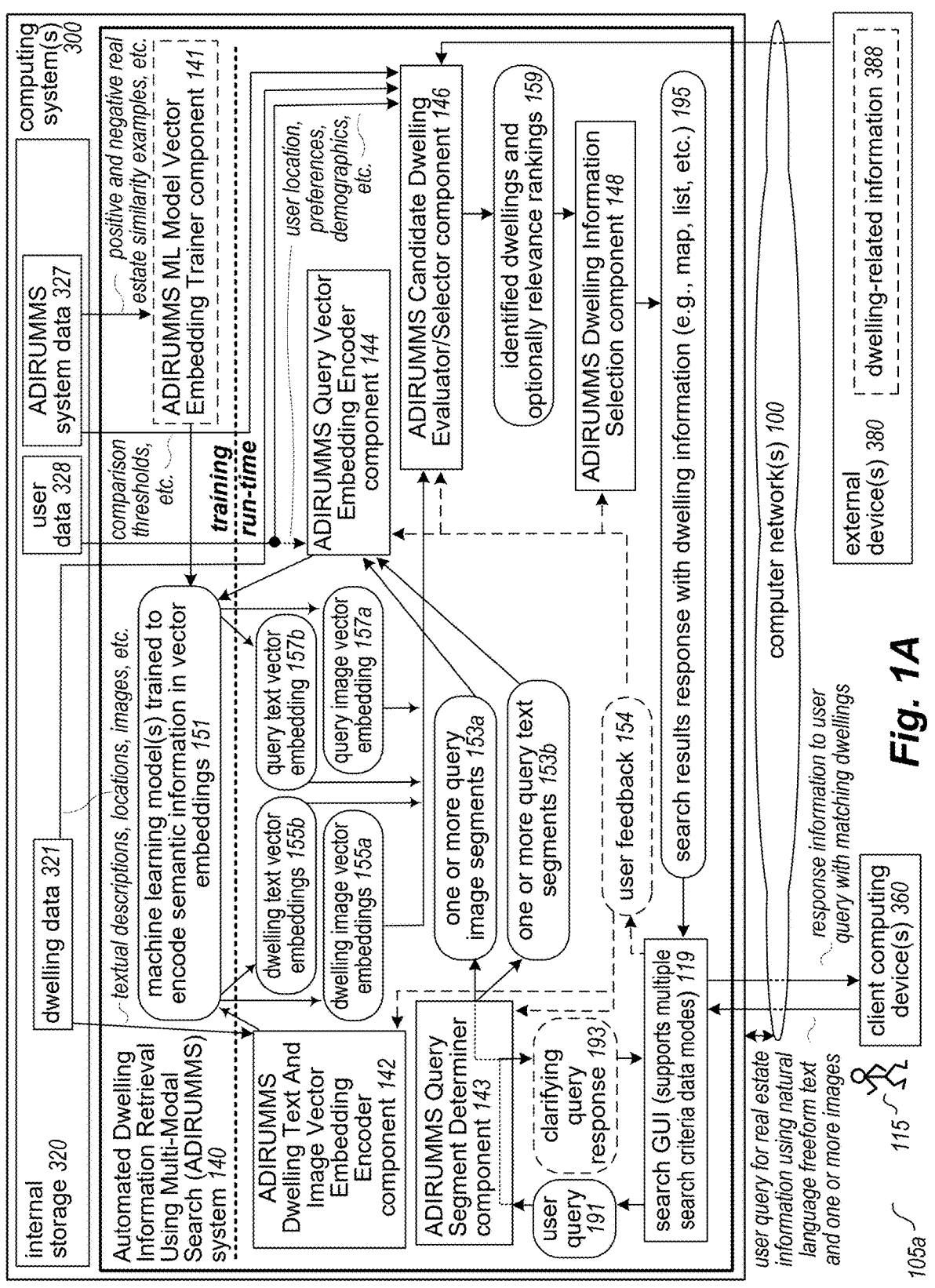

The present disclosure describes techniques for using computing devices to perform automated operations involving automatically determining and providing information about dwellings in response to search criteria using data of multiple modes, such as to automatically respond to a dwelling-related search query that has multiple modes of data including at least free-form natural language text and one or more images by generating and using encoded representations of semantic content of the data of the multiple data modes to identify matching dwellings. In at least some embodiments, the described techniques include training one or more machine learning ("ML") models to encode semantic information about dwellings from multiple data modes into corresponding vector-based embeddings (also referred to herein as a "vector embeddings"), and then using the trained ML model(s) to generate dwelling vector embeddings for some or all dwellings in one or more geographical areas, such as to encode textual data about a dwelling from a textual narrative description of the dwelling as well as dwelling information in one or more other textual forms (e.g., a plurality of keyword-value pairs to describe attributes of the dwelling), to encode visual data about the dwelling from one or more images, and to optionally encode data about the dwelling from data of one or more other media data modes (e.g., videos, audio clips, etc.). After the generation of the dwelling vector embeddings, the described techniques may include receiving a search query that specifies multiple search criteria with data of multiple modes (e.g., a textual characterization of target dwellings of interest using a sequence of multiple free-form natural language terms including narrative text and optionally one or more keywords with associated values, one or more representative images of dwelling portions, etc.), and generating one or more query vector embeddings to encode data about the search criteria (e.g., at least one vector embedding for each mode of data, a single vector embedding that encodes data of multiple modes, etc.). The described techniques further include determining one or more target dwellings for the query by matching generated dwelling vector embeddings of candidate dwellings to the generated query vector embedding(s) for the query in various manners in various embodiments, with information about determined target dwelling(s) then further used. Additional details are included below regarding automatically responding to a dwelling-related search query using multiple modes of data by generating and using multiple encoded representations of semantic content of the data of the multiple data modes to identify matching dwellings, and some or all of the techniques described herein may, in at least some embodiments, be performed via automated operations of an Automated Dwelling Information Retrieval Using Multi-Modal Search ("ADIRUMMS") system, as discussed further below.

As noted above, the described techniques may include obtaining descriptive data of multiple modes about each of a plurality of dwellings (e.g., some or all dwellings in each of one or more geographical areas), and generating one or more dwelling vector embeddings for each dwelling to encode data about its descriptive data. In at least some embodiments, the described techniques include generating at least one text vector embedding for each dwelling to encode semantic representations of at least some available textual description information for that dwelling, generating at least one image vector embedding for each dwelling to encode semantic representations of visual content of one or more associated images for the dwelling (e.g., a separate image vector embedding for each image), and optionally at least one additional media type vector embedding for each dwelling to encode semantic representations of content of one or more other media types separate from images and text (e.g., a separate vector embedding for each type of other media, for each piece of media of one of the other media types, etc.). In other embodiments and situations, some or all such descriptive data for a dwelling of the one or more other media types may be handled in other manners, such as to convert the other media into one or both of textual data or visual data and to generate separate respective textual and/or image vector embeddings for that converted data, or to otherwise encode that converted data into one or more textual and/or image vector embeddings, respectively, along with other respective textual data or image data for that dwelling-as non-exclusive examples, a video of some or all of a dwelling's exterior and/or interior may be used to generate one or more corresponding image embedding vectors by treating some or all video frames (e.g., selected frames) as separate images associated with the dwelling and analyzing them similarly to other images associated with the dwelling to encode visual content of those video frames, and/or descriptive textual data for a video and/or audio clip may be automatically generated (e.g., using one or more associated trained ML models) and may be used to generate one or more corresponding textual embedding vectors that encode the generated descriptive textual data.

In a similar manner, the described techniques may include receiving a search query that specifies multiple search criteria using data of multiple modes, and generating one or more query vector embeddings to encode data about the search criteria, such as in at least some embodiments by generating at least one text vector embedding for the query to encode semantic representations of at least some available t textual description information in a received textual characterization of one or more target images of interest, generating at least one image vector embedding for the query to encode semantic representations of visual content of one or more indicated images in the search query (e.g., a separate image vector embedding for each image), and optionally at least one additional media type vector embedding for the query to encode semantic representations of content of one or more other media types separate from images and text (e.g., a separate vector embedding for each type of other media, for each piece of media of one of the other media types, etc.). In other embodiments and situations, some or all such descriptive data in search criteria of the one or more other media types may be handled in other manners, such as to convert the other media into one or both of textual data or image data and to generate separate respective textual and/or image vector embeddings for the query for that converted data, or to otherwise encode that converted data into one or more textual and/or image vector embeddings, respectively, along with other respective textual data or image data for the query—as non-exclusive examples, a video of some or all of a representative dwelling's exterior and/or interior supplied in the search criteria may be used to generate one or more corresponding image embedding vectors by treating some or all video frames (e.g., selected frames) as separate images indicated for the query and analyzing them similarly to other images associated with the dwelling to encode visual content of those video frames, and/or descriptive textual data for a video and/or audio clip may be automatically generated (e.g., using one or more associated trained ML models) and may be used to generate one or more corresponding textual embedding vectors for the query that encode that generated descriptive textual data. In addition, in at least some embodiments and situations, one or more of the query vector embeddings may be further personalized to a user who submitted the query by further encoding content in the query vector embedding that is specific to the user (e.g., preferences, prior search interactions, etc.) in addition to content from the multiple search criteria of the query.

After the dwelling vector embeddings are generated for a plurality of dwellings and multiple query vector embeddings are generated for a received query with multiple search criteria, the described techniques may further include identifying different groups of dwellings from the candidate dwellings that match the query based on different types of generated vector embeddings, and combining results from some or all of the matching activities for different types of vector embedding-based matches to determine one or more matching target dwellings. For example, the described techniques may include performing a first vector embedding-based search that measures differences between a generated query text vector embedding and generated dwelling text vector embeddings of the candidate dwellings, and selecting one or more first dwellings based on the differences (e.g., candidate dwellings with measured differences below a first defined threshold), and may further include performing a second vector embedding-based search that measures differences between one or more generated query image vector embeddings and generated dwelling image vector embeddings of the candidate dwellings, and selecting one or more second dwellings based on the differences (e.g., candidate dwellings with measured differences below a second defined threshold, whether the same or different from the first defined threshold)—if additional dwelling and query vector embeddings are available for one or more other media types, the described techniques may further include performing a third vector embedding-based search for each such additional type of vector embeddings that measures differences between one or more generated query vector embeddings for that media type and generated dwelling vector embeddings of the candidate dwellings for that media type, and selecting one or more third dwellings based on the differences (e.g., candidate dwellings with measured differences below a third defined threshold, whether the same or different from the first and/or second defined thresholds).

In at least some embodiments and situations, the different vector embedding match activities for different types of vector embeddings are performed independently for a given search query and the results of the multiple searches are subsequently combined to identify zero or more target dwellings that satisfy the multiple search criteria specified for the search query, while in other embodiments and situations the multiple matching activities may be employed in other manners (e.g., to optionally first identify candidate dwellings using information of predefined types, such as geographical area and/or POI location and/or dwelling type; to next identify a first subset of the candidate dwellings using one of the types of vector embeddings, such as first dwellings that match one or more query text vector embeddings; to next identify a further second subset of the candidate dwellings in the first subset, such as second dwellings that match one or more query image vector embeddings; to next identify a further third subset of the candidate dwellings in the second subset, such as third dwellings that match one or more query vector embeddings of one or more other media types; etc.). When the results of the multiple search strategies are combined after the multiple matching activities are independently performed, the results may be combined to determine zero or more target dwellings that satisfy the search query in various manners in various embodiments, such as one or more of the following: to select all dwellings that appear in all of the matching results and thus satisfy all of the multiple criteria as the target dwellings, and to optionally use information about degrees of match to rank or otherwise order the search results (e.g., using a distance or other difference from the vector embedding-based matches, using a trained ML model, etc.); to select dwellings that appear in some of the matching results (e.g., only one of the vector text embedding-based match and the vector image embedding-based match(es), only one or some but not all of multiple vector image embedding-based match (es), etc.) as the target dwellings and to optionally use information from other matching results and/or other information about degrees of match to rank or otherwise order the search results; etc. After such filtering and/or ranking, a subset of one or more of the remaining identified dwellings may further be selected in some embodiments (e.g., a top Y, where Y is a defined quantity threshold, such as 1 or 10 or 100; a top Y %, where Y is a defined percentage threshold, such as 1% or 5% or 10%; etc.), while in other embodiments all remaining identified dwellings may be selected—if multiple such identified dwellings are selected, they may be further provided in a ranked or otherwise ordered manner, such as with a highest-ranked dwelling first. In other embodiments and situations in which results are provided in a manner overlaid on or otherwise in association with a map, the indicated dwellings may not be ranked, or rankings may be indicated using visual cues for respective dwellings (e.g., using sizes, colors, highlighting, flashing, etc.). Additional details are included below regarding generating search results to a received search query that include identified target dwellings, including with respect to the examples of FIGS. 2A-2E.

The identified target dwelling(s) may be further used in various manners in various embodiments, such as to be presented or otherwise provided as search results (e.g., as a list, optionally rank-ordered; overlaid on a map; etc.). Responsive information for the query that includes the one or more identified dwellings may further be provided in various manners in various embodiments, such as in a GUI (graphical user interface) displayed to a user who submitted the query via the GUI. In addition, it will be appreciated that various types of information may be provided for an identified dwelling, such as images, textual descriptions, 3D models and other floor plans, prices, statistical data (e.g., square feet, quantity of bedrooms and bathrooms, etc.), videos, comments and other user-generated data, etc., that types of information may be selected to be provided in various manners (e.g., based on instructions received in the search query, using user preferences, using defaults unless otherwise specified, etc.), and that the GUI may provide functionality to enable a user to obtain further information about one or more dwellings selected by the user. Additional details are included below regarding using search results to a received search query that include identified target dwellings, including with respect to the examples of FIGS. 2A-2E.

As noted above, the query vector embedding and dwelling vector embeddings are generated in at least some embodiments using a ML model trained to encode semantic relationships and other semantic information about dwellings in a vector-based embedding, such as to convert high-dimensional data into low-dimensional vectors that preserves the underlying structure and content of the data—due to such preservation of the structure and content of the data, two vector embeddings that encode similar content are themselves similar, such that the difference between two such vector embeddings is small (e.g., as measured using an inter-vector distance). The ML model may have various forms in various embodiments, and may be generated and trained in various manners in various embodiments. As non-exclusive examples, an ML model used for generating text vector embeddings may be a word-embedding model or text-embedding model that is generated using at least one of General Text Embeddings (GTE) with multi-stage contrastive learning, BERT (Bidirectional Encoder Representations from Transformers), Word2Vec (e.g., using continuous bag of words, or CBOW, and/or Skip-gram), principal component analysis (PCA), singular value decomposition (SVD), etc.; a ML model used for generating image vector embeddings and/or video vector embeddings may be a visual data analysis model that learns similar visual content, such as generated using at least one of Contrastive Language-Image Pretraining (CLIP) that learns visual concepts from natural language supervision and is trained using image-text pairs, Contrastive Captioners (CoCa) that pretrains an image-text encoder-decoder foundation model jointly with contrastive loss and captioning loss, Florence that learns visual concepts at a fine-grained object level from static images and/or dynamic videos and analyzes depth data and/or captions in addition to RGB visual data, UNiversal Image-TExt Representation (UNITER) learning that simultaneously processes multimodality inputs for joint visual and textual understanding, Object-Semantics Aligned Pre-training for Vision-Language Tasks (Oscar) that learns cross-modal representations on image-text pairs using object tags detected in images as anchor points for learning of alignments, etc.; and these or other models may be used for generating vector embeddings for other media types. The training of each ML model may include, for example, using positive and negative examples (e.g., for a ML model used for generating text vector embeddings, positive examples each including two or more first real estate phrases that are semantically similar, and negative examples that each includes two or more second real estate phrases that are not semantically similar; for a ML model used for generating image vector embeddings, positive examples each including two or more first real estate images that are visually similar and/or have associated textual descriptions that are semantically similar, and negative examples that each includes two or more second real estate images that are not visually similar and/or have associated textual descriptions that are not semantically similar; etc.). Additional details are included below regarding generating and using vector embeddings and generating and training a corresponding ML model, including with respect to the examples of FIGS. 2A-2E.

The described automated techniques provide various benefits in various embodiments, including to significantly improve the identification and use of responsive information to specified queries for information about dwellings in indicated locations, including queries with multiple search criteria specified using multiple modes of data that in some cases include a textual characterization specified in a natural language format and one or more representative images, and such as to more accurately determine matching dwellings by using a combination of multiple modes of data. Such automated techniques also allow such responsive answer information to be generated much more quickly and efficiently than previously existing techniques (e.g., using less storage and/or memory and/or computing cycles) and with greater accuracy, based at least in part on using the described techniques, including by defining and using dwelling vector embeddings that encode semantic information from building descriptions and building images of respective dwellings and matching corresponding query vector embeddings to such dwelling vector embeddings, etc. In addition, in some embodiments the described techniques may be used to provide an improved GUI in which a user may more accurately and quickly obtain information, including in response to an explicit request (e.g., in the form of a natural language query), as part of providing personalized information to the user, etc. Various other benefits are also provided by the described techniques, some of which are further described elsewhere herein.

In at least some embodiments, a textual description for a dwelling may include at least a textual narrative in free-form natural language, and one or more keywords with associated values to describe attributes of the dwelling, and optionally other additional textual descriptive data for the dwelling (e.g., textual data obtained from one or more public data sources, such as property records, tax records, neighborhood crime reports, neighborhood feature descriptions, etc.; textual information generated from analysis of images of a dwelling interior and/or exterior and/or of other modes of media data describing the dwelling; etc.)—if so, a generated text vector embedding for the dwelling may encode semantic information of at least the textual narrative and in some cases of the keywords and associated values and/or of the additional textual descriptive data, although in other embodiments multiple text vector embeddings may be generated for a dwelling to correspond to different types and/or sources of textual description data (e.g., a first text vector embedding for the textual narrative, a second text vector embedding for the keyword-value pairs or other associated values for keywords, one or more third text vector embeddings for each of one or more other types and/or sources of textual description data, etc.). Similarly, the multiple search criteria for a dwelling-related query may include a textual characterization of one or more target dwellings of interest that similarly includes text of one or more types (e.g., one or more keywords each having one or more associated values, a textual narrative using freeform terms, etc.), and a generated text vector embedding for the query may encode semantic information of at least an included textual narrative and in some cases of keywords and associated values and/or of additional textual descriptive data (e.g., generated textual descriptions of one or more images included in the multiple search criteria), although in other embodiments multiple text vector embeddings may be generated for a query to correspond to different types and/or sources of textual description data (e.g., a first text vector embedding for the textual narrative, a second text vector embedding for the keyword-value pairs or other associated values for keywords, one or more third text vector embeddings for each of one or more other types and/or sources of textual description data, etc.).

In some embodiments and situations, the ADIRUMMS system may analyze received textual data of a textual characterization in a query's multiple search criteria by, for example, segmenting multiple free-form natural language terms of a received query into multiple segments that each corresponds to a different search criteria, such as to include segments that each indicates one of the following: a type of dwelling (e.g., houses, homes, apartments, condominiums, etc.); a geographical area (e.g., cities, counties, states, neighborhoods, etc.); a point-of-interest (POI) location (e.g., particular parks, beaches, lakes, businesses, etc.), optionally with a specified distance radius or indeterminate distance indication ("nearby", "close to", etc.); a dwelling-related attribute (e.g., number of bedrooms and/or bathrooms, square footage, property size, dwelling style, price, etc.) and optionally one or more associated attribute values; a neighborhood and/or surroundings attribute (e.g., close to a body of water, a kid-friendly area, etc.) and optionally one or more associated attribute values; etc., as well as one or more conjunctive (e.g., "and") and/or disjunctive (e.g., "or") terms to connect two specified search criteria—in other embodiments, some such criteria (e.g., geographical location, POI location, dwelling type, etc.) may be determined in manners other than being included in the search query, such as to be associated with the user who submits the search query (e.g., based on the user's location, preferences, prior search interactions, etc.) and/or based on a search interface being used (e.g., one specific to houses or apartments). Such segmenting of a sequence of terms of the query's textual characterization may be performed in various manners in various embodiments, such as by identifying matches in one or more dictionaries (e.g., general-purpose dictionaries, dictionaries of POI location names, dictionaries of geographical area names, etc.), lists of predefined keywords, lists of dwelling types, or other lists of word/phrase breaks, including in some embodiments and situations by considering each combination of singleton terms and two or more adjacent terms to determine if they match POI locations or geographical areas (e.g., for a sequence of terms such as "Space Needle Seattle", considering alternative name-based designations of "Space", "Needle", "Seattle", "Space Needle", "Needle Seattle", and "Space Needle Seattle", and concluding that "Space" is grouped with "Needle" to identify a POI location name, leaving the name-based designation of "Seattle" to identify a surrounding geographical area that together uniquely identify the POI location, such as to differentiate the Space Needle in Seattle from other space needles in other geographical areas), etc. In some embodiments, each combination of terms is treated as a separate segment (e.g., for a sequence of terms such as "Stamford New York", using all of "Stamford", "New", "York", "Stamford New", "New York" and "Stamford New York" as separate segments), or search queries may be parsed without using such segments. In addition, in some embodiments and situations, the received query may, in addition to the multiple segments each corresponding to a geographical area or a POI location, include one or more additional segments for one or more additional search criteria of one or more types, such as one or more of the following: dwelling-type designations (e.g., 'apartment', 'single family house', 'condominium', etc.); POI categories (e.g., "beaches", "parks", "schools" "hospitals", "lakes", etc.); indeterminate distance indications that are associated with one or more POI locations and/or POI categories (e.g., "nearby" or analogous terms such as "near", "by", "around", "at", "close to", "adjacent", etc.; a travel-based distance measure with an indicated travel type, such as walking or bicycling or scootering or driving or bus or train or light rail or mass transit; etc., and an associated amount of travel time that is specified or otherwise determined); non-location-related search filters or other search criteria, such as search criteria related to dwelling attributes (e.g., minimum and/or maximum and/or target price, number of bathrooms, number of bedrooms, etc.), etc. In some embodiments and situations, some search criteria such as geographical area and/or dwelling type and/or indeterminate distance and/or other dwelling-related attributes may be automatically determined for use with the search query (e.g., inferred, selected as a default, etc.), optionally based on information specific to a user who submitted the search query and/or a current context (e.g., as part of an ongoing search interaction session by using previously specified details).

The described techniques may further in some embodiments include selecting different parts of a received search query to handle separately in addition to one or more query vector embeddings that are generated and used for the query, such as to identify any first segments with dwelling-related attributes having a keyword term matching a group of predefined keywords (e.g., those used in a group of standardized dwelling keyword-value pairs, such as on typical MLS, or multiple listing service, forms), to identify any second segments of other predetermined types (e.g., geographical area; POI location; dwelling type; etc.), and to identify any third segments that are not of the other predetermined types and do not include any of the predefined keywords (e.g., "close to a park", "with good schools", "mid-century modern or modern farmhouse", etc.), and to apply different search strategies to different parts of the received search query. For example, the described techniques may further use the identified second segments of other predetermined types to limit the candidate dwellings that are considered as possible matches, such as to limit the candidate dwellings to those in a specified geographical area, to those within an indicated distance of a POI location and/or to those of an indicated dwelling type, or may otherwise determine a group of candidate dwellings to consider in other manners (e.g., using similar types of information determined other than as part of the search query). The described techniques may further use the identified first segments each having a keyword term and optionally one or more associated values to perform a keyword-based search to match keywords included in building descriptions of a group of first dwellings identified from the candidate dwellings (e.g., using a plurality of keyword-value pairs in the building descriptions), with any included associated values being further matched to corresponding values for the first dwellings' attributes (e.g., "3 or more bedrooms" to match dwellings' keyword-value pairs such as "bedrooms: 3", "bedrooms: 4", "bedrooms: 5", etc.)—in at least some embodiments and situations, such searching may include using an inverted index-based search. The described techniques may further optionally use the identified third segments to perform a phrase-based exact or near-exact search to match a phrase in a third segment to corresponding phrases included in narrative building descriptions of a group of second dwellings identified from the candidate dwellings, such as to perform an exact match, or to identify near-exact matches by using one or more of synonyms, stemming and lemmatization to substitute alternative terms in the third-segment phrase. Additional details are included below regarding analyzing a received search query and using different parts of the search query in different manners, including with respect to examples of FIGS. 2A-2E.

In addition, the automated operations of the ADIRUMMS system in at least some embodiments include determining, for each of a plurality of POI locations in one or more geographical areas, a geographical region specific to that POI location in an individualized manner for that POI location, such as to represent a geographical region around or otherwise for that POI location that includes additional locations (e.g., dwellings) considered to be nearby that POI location. In at least some embodiments, the determination of such a POI-specific nearby geographical region for a particular POI location is based on one or more attributes of that POI location, such as one or more of the following non-exclusive list: a category of the POI location (e.g., beach, lake, school, park, hospital, etc.), such as to have different defined distances associated with each POI category that represent locations 'near' a POI location of that POI category; a type of the one or more geographical areas in which that POI location is located (e.g., urban, suburban, rural, etc.), such as to have different defined distances associated with each type of geographical area that represent locations 'near' a POI location in that type of geographical area; a shape of that POI location (e.g., a single GPS point location; a regular or irregular geometric two-dimensional or three-dimensional shape, such as circles or ovals or squares or rectangles for a regular two-dimensional geometric shape, and represented by a group of GPS point locations, such as for some or all of a boundary, or instead by a single GPS point location to represent such a shape, such as a center; a two-dimensional line or three-dimensional wall; etc.), such as to have different defined distances associated with each type of POI location shape that represent locations 'near' a POI location of that POI location shape; etc. In embodiments in which multiple POI location attributes are used to determine the size for a POI-specific nearby geographical region (also referred to at times herein as a "POI-specific geographical region"), the sizes associated with different such attributes may be combined in various manners in various embodiments, such as to use an average (e.g., a weighted average), a maximum, a minimum, etc. In addition, in some embodiments each of some or all POI locations may have multiple predefined POI-specific nearby geographical regions, such as to correspond to geographical regions that are 'near' that POI location for each of multiple travel types (e.g., walking, cycling, scootering, driving, bus, train, light rail, mass transit, etc.) and/or associated travel times (e.g., 'within 5 minutes walking', 'within 10 minutes walking', . . . , 'within 5 minutes driving', 'within 10 minutes driving', etc.), and/or that are 'near' that POI location for other factors (e.g., based on time-of-day, day-of-week, month, season, etc.). Furthermore, in some embodiments a POI-specific nearby geographical region for a POI location may be generated using a consistent defined size to encircle a boundary of that POI location's shape, while in other embodiments may be approximated in other manners (e.g., using a bounding box or bounding circle or other bounding shape), using different sizes for different portions of a boundary of that POI location, etc. In addition, in some embodiments a predefined POI-specific nearby geographical region for a POI location may be adjusted or otherwise modified for use with a particular search query, such as to reflect explicit or implicit preferences of a user who submitted the search query (e.g., to increase or decrease the geographical region boundaries for a user who has a more expansive or restrictive, respectively, conception of 'nearby' than average or typical).

The automated operations of the ADIRUMMS system in at least some embodiments include managing received search queries that specify an indeterminate travel-based distance that includes at least a travel type and optionally a travel time-in cases in which a travel time is not indicated (e.g., "within walking distance of"), the ADIRUMMS system may select a travel time to use, such as specific to that travel type or instead the same for all travel types, based on information specific to the user who submitted the query, etc. The system may determine geographical distances associated with such a travel-based distance in various manners in various embodiments, such as to use geographical mapping/travel functionality to determine additional locations that are reachable from each of some or all GPS boundary locations associated with that POI location when using that travel type for that travel time, combine the additional locations that are determined for all of the POI location boundary, and determine a geographical region that includes all those additional locations (e.g., a smallest enclosing geographical region)-as one example, if using a travel type that corresponds to roads (e.g., walking, driving, bicycling, scooting, etc.), the determination of the additional locations may include moving outward from the POI location's boundaries along all roads in a widening search at each road junction until all possible locations reachable within that travel time for that travel type are identified. In other embodiments and situations, nearby geographical region boundaries specific to particular POI locations may be determined in other manners, such as to estimate one or more geographical distances corresponding to a given travel type and travel time, and to use such estimated geographical distance(s) in generating a POI-specific nearby geographical region for a particular POI location.

The automated operations of the ADIRUMMS system in at least some embodiments include managing received search queries that specify a POI category, such as instead of or in addition to a particular POI location. In at least some embodiments, in order to manage such a specified POI category, one or more geographical areas associated with such a search query are determined, whether as specified in the search query or instead in other manners (e.g., specific to a user who submitted the search query, such as based on the user's location and/or other user preferences; based on a context of previous interactions during an interactive search session; etc.). After the one or more geographical areas are determined, each POI location within those one or more geographical areas of that POI category are identified, and may then each be used as an alternative POI location for the search, such as to individually use the predefined POI-specific nearby geographical region for each such POI location in order to identify potentially matching dwellings in that geographical region. In addition, in at least some embodiments and situations, the speed and/or accuracy of identifying dwellings that are within the POI-specific nearby geographical region for a particular POI location or for multiple such POI locations of a particular POI category is enhanced by predefining one or more attributes for each of some or all dwellings that associate that dwelling with the particular POI locations (if any) for which that dwelling falls within their respective predefined POI-specific nearby geographical regions, or that associate that dwelling with the particular POI categories (if any) for which that dwelling falls within the respective predefined POI-specific nearby geographical region for at least one particular POI location of that POI category-in such situations, the identification of a dwelling corresponding to a particular POI location or a particular POI category in a particular geographical area may include reviewing each dwelling in that geographical area to determine if it includes one or more such attributes that associate that dwelling with that particular POI location or POI category.

The automated operations of the ADIRUMMS system in at least some embodiments include managing received search queries that specify one or more conjunctive and/or disjunctive terms that each connects two surrounding or otherwise adjacent search criteria (e.g., criteria A 'and' criteria B, criteria A 'or' criteria B, etc., in which A and B may be criterion such as POI location, POI category, dwelling type, geographical area, etc.). In at least some embodiments and situations, when a disjunctive term is used to connect two search criteria that each has one or more associated geographical regions (e.g., POI location 1 or POI location 2, POI location 1 or POI category 1, POI category 1 or POI category 2, etc.), an aggregate geographical region may be determined and used that is the set-based union of the two or more associated geographical regions for the two search criteria, such as an aggregate geographical region that includes multiple separated individual geographical regions within it, or instead an aggregate geographical region that is the superset of all of the individual geographical regions as well as the intervening areas between them. Similarly, in at least some embodiments and situations, when a conjunctive term is used to connect two search criteria that each has one or more associated geographical regions (e.g., POI location 1 and POI location 2, POI location 1 and POI category 1, POI category 1 and POI category 2, etc.), an aggregate geographical region is determined and used that is the set-based intersection of the two or more associated geographical regions for the two search criteria, such as an aggregate geographical region that includes only those locations belonging to all of the two or more associated geographical regions. In other embodiments, no such aggregate geographical region may be used, and instead the identification of dwellings may be performed for each of the two or more associated geographical regions for the two search criteria, with the resulting identified dwellings subsequently combined using the appropriate union or intersection for the corresponding disjunctive or conjunctive term, respectively. Other geographical constraints may similarly be specified and used, such as "within walking distance of" types of locations (e.g., highly rated restaurants), including with respect to conjunctive and disjunctive terms, and the determination of resulting geographical search regions may be similarly determined.

The automated operations of the ADIRUMMS system in at least some embodiments include, after determining one or more predefined POI-specific nearby geographical regions to use for one or more POI locations to use as one or more geographical search regions for a user query, using the determined geographical search region(s) to determine and provide responsive information for the received query, such as information about one or more identified dwellings that are in the geographical search region(s) and thus proximate to the respective POI location(s). As one non-exclusive example, dwellings may be identified that are located in the determined geographical search region(s) and that further satisfy any additional specified non-location-related search filters or other search criteria (e.g., included in the received query). The identified dwellings may be further filtered and/or ranked in various manners, such as using one or more of the following: proximity to the POI location(s); one or more additional non-location-related search filters or other search criteria specified in the query; one or more user preferences of a user who submitted the received query, such as to improve the ranking of dwellings for closer matches with the user preference(s); etc. After such filtering and/or ranking, a subset of one or more of the remaining identified dwellings may further be selected in some embodiments (e.g., a top Y, where Y is a defined quantity threshold, such as 1 or 10 or 100; a top Y %, where Y is a defined percentage threshold, such as 1% or 5% or 10%; etc.), while in other embodiments all remaining identified dwellings may be selected—if multiple such identified dwellings are selected, they may be further provided in a ranked manner, such as with a highest-ranked dwelling first. In other embodiments and situations in which results are provided in a manner overlaid on or otherwise in association with a map, the indicated dwellings may not be ranked, or rankings may be indicated using visual cues for respective dwellings (e.g., using sizes, colors, highlighting, flashing, etc.). Responsive information for the query that includes the one or more identified dwellings may further be provided in various manners in various embodiments, such as in a GUI (graphical user interface) displayed to a user who submitted the query via the GUI. In addition, it will be appreciated that various types of information may be provided for an identified dwelling, such as images, textual descriptions, 3D models and other floor plans, prices, statistical data (e.g., square feet, quantity of bedrooms and bathrooms, etc.), videos, comments and other user-generated data, etc., that types of information may be selected to be provided in various manners (e.g., based on instructions received in the search query, using user preferences, using defaults unless otherwise specified, etc.), and that the GUI may provide functionality to enable a user to obtain further information about one or more dwellings selected by the user.

Additional details related to operations for receiving, analyzing and responding to search queries are included in U.S. Non-Provisional patent application Ser. No. 18/583, 602, filed Feb. 21, 2024 and entitled "Automated Tool For Determining And Providing Building Information For Multiple Partially Described Proximate Geographical Regions"; in U.S. Non-Provisional patent application Ser. No. 18/642, 246, filed Apr. 22, 2024 and entitled "Automated Tool For Determining And Using User-Specific Predicted Attributes Of Dwellings That Users Will Later Occupy"; in U.S. Non-Provisional patent application Ser. No. 18/632,217, filed Apr. 10, 2024 and entitled "Automated Tool For Determining And Providing Information About Dwellings Using Heterogenous Search Strategies"; and in U.S. Non-Provisional patent application Ser. No. 18/622,829, filed Mar. 29, 2024 and entitled "Automated Tool For Determining And Providing Information About Dwellings Within Geographical Regions That Are Determined Specific To Indicated Locations"; each of which is incorporated herein by reference in its entirety.

FIGS. 1A-1C are network diagrams illustrating an example system for performing described techniques, including automatically responding to a dwelling-related search query using multiple modes of data including at least free-form natural language text and one or more images by generating and using multiple encoded representations of semantic content of the data of the multiple data modes to identify matching dwellings.

In particular, FIG. 1A illustrates information 105a about an example embodiment of an ADIRUMMS system 140 executing on one or more computing systems 300, and interacting over one or more computer networks 100 with one or more client computing devices 360, such as to receive query requests from users 115 of the client computing devices for information about dwellings and to provide corresponding responses with requested dwelling information (e.g., as part of search results). In the illustrated embodiment, the computing systems 300 may store various information on storage 320 that is used by the ADIRUMMS system during operation (e.g., in one or more databases), including dwelling data 321 about dwellings in one or more geographical areas (e.g., in one or more countries, states, cities, etc., including information about textual building descriptions of the dwellings), user data 328 (e.g., user location; user preferences, such as expressly specified and/or implicitly determined from past activities of the user such as viewing or otherwise interacting with information about dwellings; prior and/or concurrent search interaction sessions with the user; etc.), and ADIRUMMS system data 327 (e.g., search or match comparison thresholds, positive and negative training examples, information for use in textual segment determination such as word-break and/or phrase-break vocabularies, etc.). The ADIRUMMS system may further optionally retrieve and use other dwelling-related information 388 of one or more types stored externally to the computing systems 300 (e.g., from one or more public and/or private information sources), such as accessed over the one or more computer networks 100 from one or more external computing and/or storage devices 380, whether in addition to or instead of information stored on storage 320.

As one example of operations of the ADIRUMMS system 140, an ADIRUMMS ML Model Vector Embedding Trainer component 141 may obtain training data from the ADIRUMMS system data 327, and use the data to generate and/or train one or more machine learning (ML) models 151 to encode semantic information in vector embeddings, such as during an initial training phase before subsequent run-time use, and as discussed in greater detail elsewhere herein. The ADIRUMMS Dwelling Text And Image Vector Embedding Encoder component 142 then uses the trained ML model(s) 151 during a run-time phase to generate dwelling vector embeddings 155 for a plurality of dwellings in one or more geographical areas (e.g., all dwellings), such as by obtaining textual description information and associated images and optionally other information for the dwellings from dwelling data 321 and supplying it to the trained ML model(s) 151, optionally after manipulating and/or generating some of the information to be encoded in a resulting dwelling vector embedding for a dwelling (e.g., analyzing images of that dwelling to generate textual descriptions of them)—in the illustrated embodiment, the component 142 generates at least one dwelling text vector embedding 155b and one or more dwelling image vector embeddings 155a for each dwelling, and optionally one or more other dwelling vector embeddings 155c (not shown) for one or more other types of media.

During further operations of the ADIRUMMS system 140, a particular user 115 of one of the client computing devices 360 may supply a query 191 about dwellings of interest to a GUI 119 provided by the ADIRUMMS system, such as to provide a textual characterization using natural language free-form input and/or one or more representative images and optionally one or more other representative types of media. The GUI provides the user query to an ADIRUMMS Query Segment Determiner component 143, which analyzes the user query to attempt to identify segments within the query corresponding to multiple search criteria, such as one or more segments with textual data (e.g., to include one or more keyword-based query segments and one or more additional textual narrative query segments that do not include any predefined keywords), one or more segments each have a supplied representative image, and optionally one or more other segments having data of one or more other media types—if the component is unable to identify such segments, such as due to the received query lacking a correct format or types of information or due to having other problems, the component instead generates and returns a clarifying query response 193 to the GUI 119 to request further information from the user and/or to indicate an inability to respond. Otherwise, the component 142 forwards the determined query segments 153, such as at least one query text segments 153b and one or more query image segments 153a and optionally one or more other query segments 153c (not shown) for one or more other types of media, to the ADIRUMMS Query Vector Embedding Encoder component 144, which supplies some or all of the segments 153 to the trained ML model(s) 151 to generate corresponding query vector embeddings 157, with the component 144 optionally further manipulating and/or generating additional information to include in the information sent to the ML model(s) 151 that is encoded in the resulting query vector embeddings 157 (e.g., to add information from user data 328 that is specific to the user 115 who submitted the user query 191 in order to personalize one or more resulting query vector embeddings 157 to that user)—in this example embodiment, the query vector embeddings 157 generated for the query include at least one query text vector embedding 157*b* and one or more query image vector embeddings 157*a* and optionally one or more other query vector embeddings 157*c* (not shown) for one or more other types of media. One example of such a component 144 is discussed in further detail with respect to FIG. 1B.

The generated query segments 153, query vector embeddings 157 and dwelling vector embeddings 155 are then forwarded to the ADIRUMMS Candidate Dwelling Evaluator/Selector component 146, along with user data 328, dwelling data 321 and ADIRUMMS system data 327, and the component 146 proceeds to determine identified dwellings 159 that match the search criteria of the user query 191, optionally along with relevance rankings for some or all of the identified dwellings-one example of such a component 146 is discussed in further detail with respect to FIG. 1C. The identified dwellings 159 are then provided to the ADIRUMMS Dwelling Information Selection component 148, which selects and generates information specific to the identified dwellings to include as part of a search results response with target dwelling information 195, such as to filter and/or rank the identified dwellings (e.g., based on the relevance rankings), to select types of information to include for each dwelling, to format the search results in a particular manner (e.g., in a list format or visual indicators overlaid on a map), etc. After the query response 195 with the dwelling information is generated by the component 148, or if the component 143 instead generates a clarifying query response 193 without forwarding the query segments 153 to the component 144, the generated query response 195 or 193 is provided via the GUI 119 to the client computing device of the user who submitted the query, such as for display on the client computing device as part of the GUI.

The same user may then provide one or more subsequent queries 191 to the GUI 119 as part of an ongoing search interaction session, such as with similar processing performed for the subsequent user queries, and optionally with the context of prior interactions during the session being maintained and used by the ADIRUMMS system (e.g., stored and used to add missing information in later queries, such as dwelling type or geographical area; stored and used to personalize query vector embeddings generated for such subsequent queries, etc.). In addition, a user may in some embodiments and situations provide optional user feedback 154, such as to indicate that incorrect search criteria have been determined for the user query, to otherwise provide feedback regarding accuracy of search results response 195 or to provide further clarifying information in response to a clarifying query response 193, to specify further user preferences to be used, etc. If so, such optional user feedback 154 may be forwarded to the components 142 and/or 143 and/or 144 and/or 146 and/or 148, such as to improve future determinations performed by the components. In other embodiments and situations, some or all such feedback may instead be implicit feedback that is determined based on an analysis of subsequent user queries (e.g., to indicate that a prior query response did not provide information that the user was seeking) and/or of prior user queries (e.g., to determine user preferences and/or user location, such as based on patterns in the prior user queries). While the example discussed above involves a single user performing multiple interactions with the ADIRUMMS system as part of an interaction session (e.g., spanning seconds, minutes, hours, days, etc.), it will be appreciated that the ADIRUMMS system may in at least some embodiments and situations be concurrently interacting with many users using different client computing devices, such as to maintain a separate GUI and interaction session history for each such user, and that a new interaction session may be initiated for a user after one or more prior interaction sessions with that user in various manners (e.g., based on a corresponding user instruction, such as to reflect a change in the types of dwelling information of interest; as determined automatically by the ADIRUMMS system, such as to reflect a change in the types of dwelling information being requested, or due to a defined period of time since a last user interaction being exceeded, such as one or more days; etc.).

Figure 3:
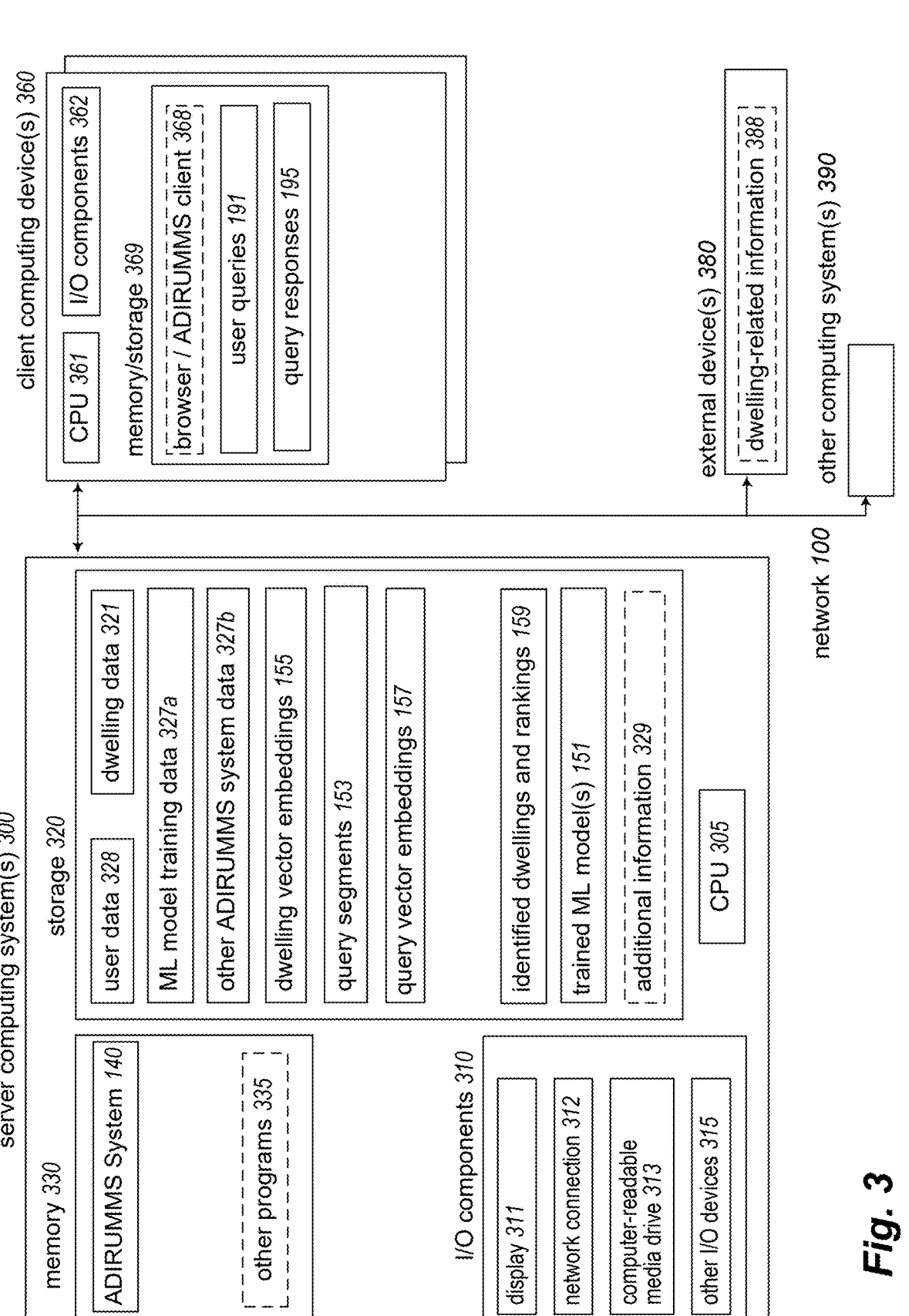
FIG. 3 is a block diagram illustrating an example of a computing system for use in performing described techniques, including automatically responding to a dwelling-related search query using multiple modes of data including at least free-form natural language text and one or more images by generating and using encoded representations of semantic content of the data of the multiple data modes to identify matching dwellings.

In addition, the computing system(s) 300 may include various other components and functionality, as discussed in greater detail elsewhere herein, including with respect to FIG. 3. The computer networks 100 may similarly be of various types in various embodiments and may include various types of wired and/or wireless segments, including one or more publicly accessible linked networks (e.g., operated by various distinct parties, such as the Internet) and/or a private network (e.g., a corporate or university network that is wholly or partially inaccessible to non-privileged users), including in some cases to have both private and public networks (e.g., with one or more of the private networks having access to and/or from one or more of the public networks).

FIG. 1B continues the example of FIG. 1A, and illustrates information 105*b* for one example embodiment of the ADIRUMMS Query Vector Embedding Encoder component 144 discussed in FIG. 1A. In particular, the component 144 performs various activities in the illustrated embodiment to receive query segments 153 for the user query 191 (e.g., one or more image segments 153*a,* one or more text segments 153*b,* and optionally one or more segments 153*c* with data of a mode other than image or textual data), along with user data 328, and to use one or more ML models 151 to generate one or more query vector embeddings to represent the query (e.g., one or more query image vector embeddings 157*a,* one or more query text vector embeddings 157*b,* and optionally one or more query vector embeddings 157*c* with data of a mode other than image or textual data).

In operation, the component 144 receives as input the query segments 153 for the user query 191, and in block 162, the component then selects some or all of the query text segment(s) to use as input to generate one or more query text vector embeddings that encode semantic content of the selected query text segments (e.g., all text, text other than keywords and any associated values, etc.). In block 164, the component then selects the query image segments to each use as input to generate a corresponding query image vector embedding that encodes semantic content of the associated image for that query segment, and optionally further analyzes each of the query images to generate a textual description of the image to include as semantic content to be encoded in the generated query image vector embedding for that image and/or in a generated text vector embedding for the query. In block 166, the component then optionally selects query segment(s) with media piece(s) of other type(s)

(e.g., voice recording or other audio clip, video, etc.), if any, to each use as input to generate a corresponding other query media vector embedding that encodes semantic content of the associated piece of media for that query segment. In block 170, the component then provides each of the selected query segments as input to one of one or more trained machine learning models 151 (e.g., a model specific to the type of media), optionally along with selected user-specific data to further personalize the query to the user, to generate a corresponding query vector embedding that encodes semantic information of the provided query segment. In other embodiments, the query may instead be represented with a single query vector embedding that encodes data of multiple modes from the query, and may be matched to corresponding dwelling vector embeddings that similarly each represents a dwelling and encodes data of multiple modes for that dwelling.

FIG. 1C continues the examples of FIGS. 1A and 1B, and illustrates information 105c for one example embodiment of the ADIRUMMS Candidate Dwelling Evaluator/Selector component 146 discussed in FIG. 1A. In particular, the component 146 performs various activities in the illustrated embodiment to receive query segments 153 for the user query 191, query vector embedding(s) 157 for the query, and dwelling vector embeddings 155 for candidate dwellings, along with user data 328, dwelling data 321 and ADIRUMMS system data 327, and to identify one or more candidate dwellings that satisfy the search criteria of the user query.

In operation, the component 146 receives as input the query segments 153 for the user query 191 (e.g., query image segment(s) 153a, query text segment(s) 153b, optionally query segment(s) 153c for one or more other media types, etc., collectively 153abc), query vector embedding(s) 157 for the query (e.g., query image vector embedding(s) 157a, query text vector embedding(s) 157b, optionally query vector embedding(s) 157c for one or more other media types, etc., collectively 157abc), and dwelling vector embeddings 155 for candidate dwellings (e.g., dwelling image vector embedding(s) 155a, dwelling text vector embedding(s) 155b, optionally dwelling vector embedding (s) 155c for one or more other media types, etc., collectively 155abc). In block 181, the component then determines any dwelling type(s) and geographical area(s) specified in the query or otherwise associated with the user who submitted the query, and restricts the candidate dwelling data for the current query to the determined dwelling type(s) and geographical area(s), if any, or otherwise selects all dwellings as candidate dwellings. In block 183, the component then determines similarities between the query image vector embedding(s) and dwelling image vector embeddings for the candidate dwellings to identify dwellings with image vector embeddings within a first similarity threshold (e.g., a measured distance between vector embeddings below a first distance-based threshold) to query image vector embedding (s), and adds identified dwellings to a first group of dwellings. In block 185, the component then determines similarities between the query text vector embedding(s) and dwelling text vector embeddings for the candidate dwellings to identify dwellings with text vector embeddings within a second similarity threshold to query text vector embedding (s), and adds identified dwellings to a second group of dwellings. In block 187, the component then optionally identifies a third group of candidate dwellings that otherwise match the query, such as to determine and use similarities within a third similarity threshold between vector embedding(s) of the query and candidate dwellings for other media types and/or of dissimilar media types, and/or to directly compare text in the query text segments (e.g., one or more keywords each optionally having one or more associated values, a natural language phrase, etc., including to optionally consider alternative phrases using synonyms and/or stemming and/or lemmatization) and/or generated textual descriptions of the query image(s) to dwellings' textual data to identify matches, etc. In other embodiments, the query may instead be represented with a single query vector embedding that encodes data of multiple modes from the query, and may be matched to corresponding dwelling vector embeddings that similarly each represents a dwelling and encodes data of multiple modes for that dwelling. In blocks 189 and 190, the component then combines identified dwellings of the first, second and third groups to generate dwelling rankings or other dwelling ordering based on at least in part on similarity to the query (e.g., using inter-vector distances and/or matching certainties and/or other factors, using a trained ML model, etc.) and/or other factors (e.g., using user-specific data, increasing weighting for dwellings present in multiple or all groups, etc.), and selects one or more ranked or otherwise ordered dwellings as being target dwellings that are identified to match the query, such as based on the associated rankings or other orderings—in at least some embodiments and situations, the selected dwellings may include those present in all of the first, second and third dwelling groups (e.g., an intersection), while in other embodiments and situations may include other dwellings, such as those present in at least two of the three dwelling groups or alternatively in only one of the three dwelling groups. The selected target dwellings and any associated relevance rankings from block 190 are then provided as output 159.

FIG. 1D illustrates examples of non-exclusive types of building description information 105d that may be available in some embodiments for an example dwelling that in this example is a house, such as existing building information that is subsequently analyzed and used by the ADIRUMMS system. In the example of FIG. 1D, the building description information 105d includes an overview textual narrative description 105d1, and well as various keyword attribute data 105d2, such as may be used in part or in whole as listing information for an MLS system. In this example, the attribute data is grouped into sections (e.g., overview attributes, further interior detail attributes, further property detail attributes, etc.), with most of the attribute data specified using keyword-value pairs each having a keyword and at least one corresponding value (although other attributes may be specified using a keyword without any associated values, such as based on the presence or absence of the keyword, such as "deck" or "pool"), but in other embodiments the attribute data may not be grouped or may be grouped in other manners and may be specified in other manners, including for the building description information to not be separated into a list of attributes and a separate overview textual narrative description. In this example, the separate overview textual narrative description emphasizes characteristics that may be of interest to viewers, such as a house style type, information of interest about rooms and other building characteristics (e.g., have been recently updated or have other characteristics of interest), information of interest about the property and surrounding neighborhood or other environment, etc. In addition, in this example, the attribute data includes objective attributes of a variety of types about rooms and the building and limited information about appliances, but may lack details of various types shown in italics in this example (e.g., about subjective attributes, about inter-room connectivity and other adjacency, about other particular structural elements or objects and about attributes of such objects, etc.), such as may instead be determined by the ADIRUMMS system via analysis of building images and/or other building information (e.g., floor plans).

It will be appreciated that various details are provided with respect to FIGS. 1A-1D for illustrative purposes, and are not intended to limit the scope of the invention unless otherwise indicated. Similarly, additional exemplary details are provided with respect to FIGS. 2A-2E and elsewhere herein, and such details are similarly provided for illustrative purposes and are not intended to limit the scope of the invention unless otherwise indicated.

FIGS. 2A-2E illustrate examples of performing described techniques, including automatically responding to dwelling-related search queries using multiple modes of data including at least free-form natural language text and one or more images by generating and using encoded representations of semantic content of the data of the multiple data modes to identify matching dwellings.

In particular, FIG. 2A illustrates information 205a including an example client computing device 360 (in this example, a smartphone) that is being used by a user (not shown) to interact with a GUI provided by the ADIRUMMS system, with current information 206 displayed in the GUI. In this example, an initial greeting screen is shown that includes a user selectable control 210a via which a user may sign in, as well as instructions regarding how to supply queries via the GUI. In this example, the user begins by entering an initial query 215a that includes a sequence of 9 natural language free-form terms of "homes near Discovery Park with 3+ bedrooms 2 bathrooms", and the ADIRUMMS system has provided corresponding response information 220a, as well as an indication of the system's interpretation 217a of the natural language free-form terms along with a user-selectable control 218a for the user to indicate if the interpretation is incorrect. In this example, the terms "Discovery Park" are interpreted as a POI location corresponding to a park in Seattle, Washington, the term "homes" is interpreted as a dwelling type indicator, the term "near" is interpreted as an indeterminate distance associated with the POI location, the term "3+ bedrooms" is interpreted as a first keyword-based segment (with a keyword of "bedrooms" and associated value(s) of 3 or more), and the term "2 bathrooms" is interpreted as a second keyword-based segment (with a keyword of "bathrooms" and associated value of 2). In addition, a determined POI-specific nearby geographical region for the POI location extends around the shape of the park in this example and is used to constrain the candidate dwellings to consider, as discussed further with respect to FIG. 2B. The matching home dwellings identified for the search query are shown in list format in this example, with several types of identified information included for each search result, such as number of bedrooms, number of bathrooms, number of square feet of the dwelling, associated price, etc., as well as an address that is a user-selectable control with which the user can select to obtain further information specific to a particular dwelling. For example, with respect to the example textual description information of FIG. 1D and the corresponding example result 2 in the list, the bedrooms and bathrooms keyword-value pairs in information 105d2 match the two keyword-based segments in the query, and the dwelling further satisfies the other predefined types of segments of "homes near Discovery Park".

FIG. 2A further illustrates a second search query 215b that is similar to search query 215a, but rather than having a single mode of data as in query 215a (textual data in that example), includes multiple modes of data by having both textual-based and image-based specification of search criteria (including a supplied image 216a that in this example provides a representative house ground-level exterior image, such as to provide information about house type/style and/or color and/or a surrounding property such as a front yard, and optionally about adjacent or otherwise nearby properties or areas), as well as to include additional textual search criteria specified using additional natural language free-form terms to indicate a phrase-based segment of "large fenced yard" for the matching candidate dwellings while not including the "2 bathrooms" text of query 215a. In response, the ADIRUMMS system generates and uses query vector embeddings (not shown) of multiple types to represent the multiple modes of search criteria data, and provides corresponding response information 220b that differs relative to information 220a (in this example by removing results 1, 3 and 4 in response 220a that do not meet the additional specified search criteria, while adding additional results that do match the additional search criteria and are within the POI-specific nearby geographical region for the Discovery Park POI location as well as match the text-based and image-based search criteria of the query 215b. In particular, a vector text embedding-based search is performed (with the query text embedding vector, not shown, based on at least the phrase "large fenced yard", and in some embodiments based on the entire query of "homes near Discovery Park with 3+ bedrooms with large fenced yard" or a partial query of "3+ bedrooms with large fenced yard"), and a vector image embedding-based search is also performed (with the query image embedding vector, not shown, encoding contents of visual data of image 216a). Using the example textual description information of FIG. 1D as an example, a dwelling text vector embedding (not shown) for the dwelling encodes information about the bedroom keyword-value pair in information 105d2 and the text of "large, fully fenced backyard" in the textual narrative description 105d1 (as well as various other textual data), resulting in a vector embedding that is similar to the query text vector embedding based on text "3+ bedrooms and large fenced yard", and the dwelling further satisfies the other predefined types of segments of "homes near Discovery Park" if that information is not encoded in the query text vector embedding (with similar information encoded in the dwelling text vector embedding). Similarly, multiple images (not shown) for that example dwelling will provide respective dwelling image vector embeddings (not shown), including in this example to have one or more exterior images of that dwelling whose respective dwelling image vector embeddings are similar to the query image vector embedding (not shown) for image 216a provided as part of the query.

FIG. 2B continues the example of FIG. 2A, and illustrates information 205b showing an alternative response to search query 215b, in which the search response information 220c in FIG. 2B is provided in the form of a map that includes a visual indicator 219 of the POI-specific geographical search region used for the Discovery Park POI location, and with the search results shown as visual indicators 221 overlaid on the map for each candidate dwelling (which in this example are user-selectable controls that the user can select in the GUI to obtain more information about a respective dwelling). It will be appreciated that in this example the POI-specific nearby geographical region for the Discovery Park POI location has a shape that is nonuniform but that is roughly based on the shape of the POI location itself, although with different distances from the boundary of the park being used in different spots (e.g., based on one or more associated attributes for that POI location and/or for the dwellings, such as to include dwellings from which the park can be reached within a defined amount of time, etc.), while in other embodiments the geographical region may be determined in other manners (e.g., a uniform geometrical shape; the same shape as the POI location but larger on some or all sides; such as all sides with land and/or dwellings; etc.). FIG. 2B further indicates 210b that a particular user has signed in, such that user-specific information may be used in various manners as discussed in greater detail elsewhere herein.

FIG. 2C continues the examples of FIGS. 2A-2B, and illustrates information 205c showing additional example search queries and associated responses by the ADIRUMMS system, such as alternative starting queries that could be used instead of search query 215b. In this example, the additional search queries include search query 215c, in which a dwelling type of apartments is indicated, in which the phrase-based segment(s) of "3+ bedrooms" and "large fenced yard" in query 215b are removed, and in which a different image 216b is shown in association with a new "bathroom" phrase to show a representative bathroom interior of interest, and with corresponding response information 220d shown. Thus, in this example, the query text vector embedding (not shown) generated for the query 215c will be based at least in part on "apartments near Discovery Park", and the query image vector embedding (not shown) generated for the query 215c will be based at least in part on visual contents of image 216b, as well as optionally to further encode the associated textual label "bathroom" from the query. The additional search queries further include search query 215d, which is somewhat similar to search query 215b, but in which the phrase-based query segment(s) include an indication of dwelling style ("mid-century modern or rambler"), with multiple images 216a and 216c included (with image 216c being a representative overhead image of at least a house of interest, and in this example to further show a surrounding area with other houses and streets and optionally parks) and having an associated label of "neighborhood" for image 216c, and with corresponding response information 220e shown. Thus, in this example, the query text vector embedding (not shown) generated for the query 215d will be based at least in part on "mid-century modern or rambler" and optionally further including "homes near Discovery Park", and two query image vector embeddings (not shown) will be generated to encode the respective visual contents and optionally associated textual labels for images 216a and 216c, which will be further matched to corresponding dwelling image vector embeddings for matching dwellings.

Figure 2D:
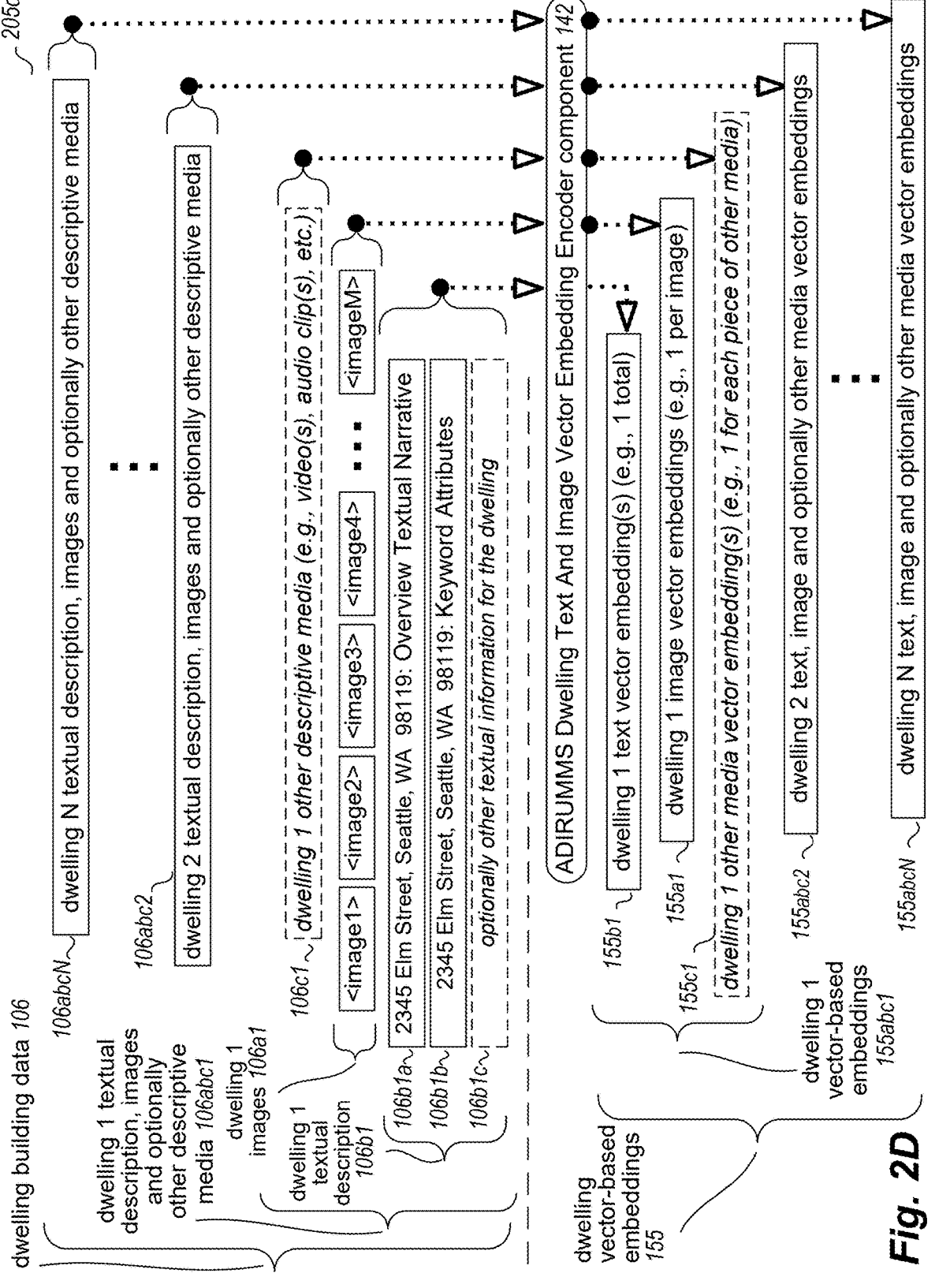

FIG. 2D continues the examples of FIGS. 2A-2C, and illustrates information 205d showing the use of the ADIRUMMS Dwelling Vector Embedding Encoder component 142 to use one or more trained ML models (not shown) to generate various dwelling vector embeddings 155 from corresponding dwelling textual description information 106. In this example, description information 106abc1 is shown for an example dwelling 1, which includes textual description information 106b1 having an overview textual narrative 106b1a, keyword attributes 106b1b, and optionally other textual information for the dwelling 106b1c (e.g., from one or more external sources), with that textual description information 106b1 used to generate a corresponding dwelling 1 text vector embedding 155b1. The description information 106abc1 for example dwelling 1 further includes multiple dwelling images 106a1 and optionally one or more other pieces of media 106c1 of one or more media types, and are used to generate one or more corresponding dwelling 1 image vector embeddings 155a1 (e.g., a separate image vector embedding for each image) and optionally one or more corresponding dwelling 1 other media vector embeddings corresponding to other media pieces 106c (if any), with the vector embeddings 155a1, 155b1, and optionally 155c1 forming the dwelling vector embeddings 155abc1 for dwelling 1. In a similar manner, description information 106d2 through 106dN of multiple data modes (not shown) for respective dwellings 2 through N are illustrated and used by the component 142 to generate corresponding dwelling vector embeddings 155abc2 through 155abcN. Additional details are included elsewhere herein regarding the generation of the dwelling vector embeddings.

Figure 2E:
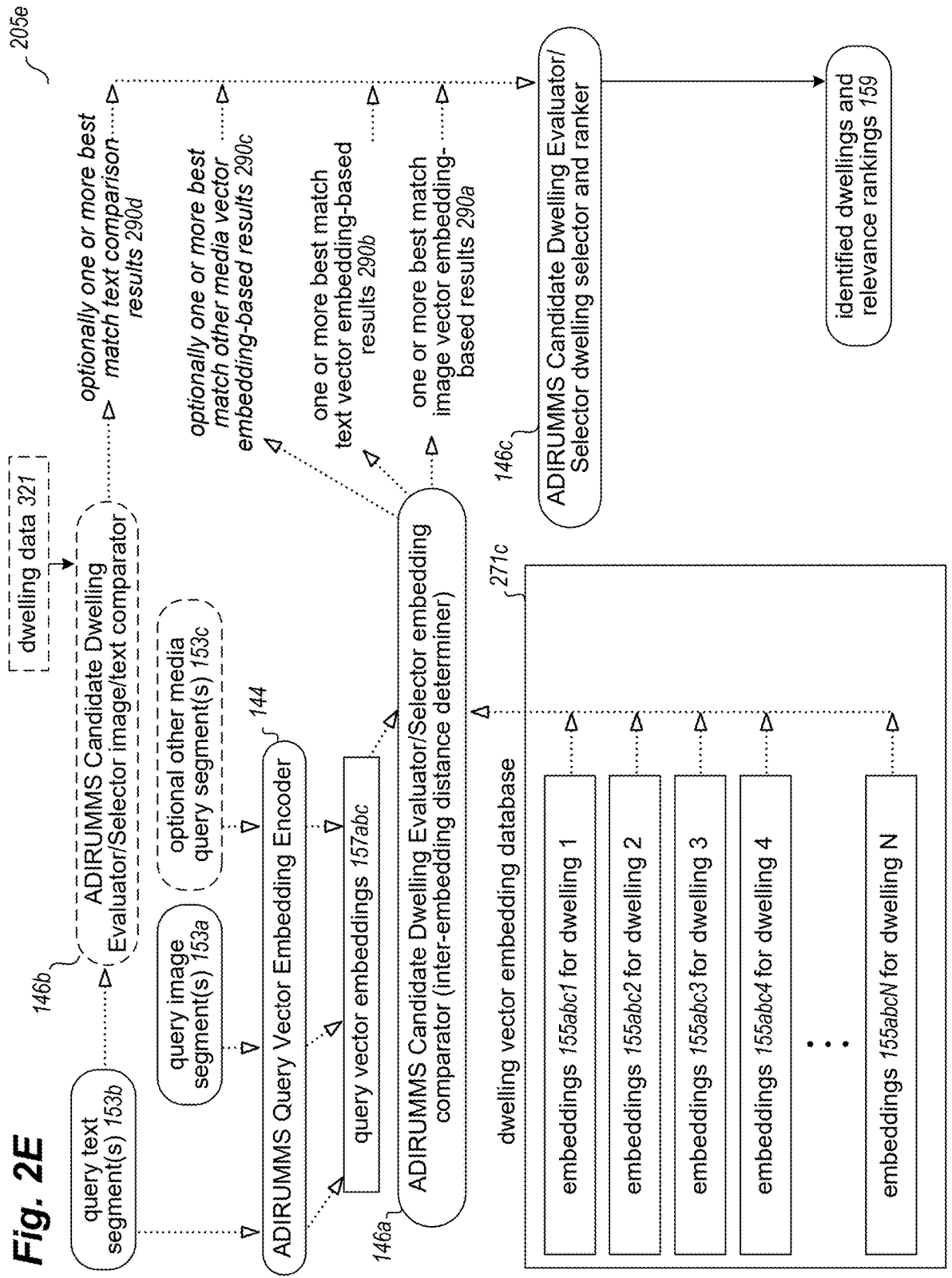

FIG. 2E continues the examples of FIGS. 2A-2D, and illustrates information 205e showing architectural details for the ADIRUMMS Candidate Dwelling Evaluator/Selector component 146 in using data of multiple modes to determine target dwellings that match a specified user query. In particular, in this example, a dwelling vector embedding database 271c is shown that includes the dwelling vector embeddings 155abc1-155abcN illustrated in FIG. 2D, with those stored vector embeddings provided to an ADIRUMMS Candidate Dwelling Evaluator/Selector embedding comparator component 146a along with query vector embeddings 157abc for an example query (not shown), with the component 146c determining inter-embedding distances and using those determined distances to identify one or more best match vector embedding-based results for each of image vector embeddings 290a, text vector embeddings 290b, and optionally other media vector embeddings 290c. In this example, the query vector embeddings 157abc are generated by an ADIRUMMS Query Vector Embedding Encoder component 144, which receives one or more query text segments 153b for the query, one or more query image segments 153a for the query, and optionally one or more other media query segments 153c. In the illustrated example, the one or more query text segments 153b may further optionally be supplied to an ADIRUMMS Candidate Dwelling Evaluator/Selector image/text comparator component 146b to perform text-based matching with corresponding dwelling data 321 optionally generate one or more best match text comparison results 290d, such as to compare keyword value pairs in a query text segment to corresponding dwelling data, to compare textual phrases in a query text segment to corresponding dwelling data to identify exact or near-exact phrases, etc. An illustrated ADIRUMMS Candidate Dwelling Evaluator/Selector dwelling selector and ranker component 146c is further illustrated that takes as input the results 290a based on image vector embeddings, the results 290b based on text vector embeddings, optionally the results 290c based on other media vector embeddings, and optionally the results 290d from other direct tax matching comparisons, and combines the results to identify one or more target dwellings 159 with optional relevance rankings. As discussed in greater detail elsewhere, the results from different matchings may be combined in various manners in various embodiments, and in some embodiments a particular search query may not include all of the illustrated types of information, such as to include only text and image segments that generate only query text and image vector embeddings.

It will be appreciated that the examples of FIGS. 2A-2E are provided for illustrative reasons only, and are not intended to limit the scope of the invention. For example, a variety of other combinations of natural language free-form search terms may be used in other embodiments and situations.

For illustrative purposes, some embodiments are described herein in which specific types of information are acquired, used and/or presented in specific ways using specific types of data structures and by using specific types of devices-however, it will be understood that the described techniques may be used in other manners in other embodiments, and that the invention is not limited to exemplary details provided. As one non-exclusive example, specific types of data structures and algorithms are generated and/or used in specific manners in some embodiments, but it will be appreciated that other types of information may be generated and used in other manners in other embodiments, including for types of information other than dwelling information. Similarly, while particular user interface display and interaction techniques are shown, other user interaction techniques may be used in other embodiments. In addition, various details are provided in the drawings and text for exemplary purposes, but are not intended to limit the scope of the invention—for example, sizes and relative positions of elements in the drawings are not necessarily drawn to scale, with some details omitted and/or provided with greater prominence (e.g., via size and positioning) to enhance legibility and/or clarity, and identical reference numbers may be used in the drawings to identify the same or similar elements or acts.

FIG. 3 is a block diagram illustrating an embodiment of one or more server computing systems 300 executing an implementation of an ADIRUMMS system 140, such as in a manner similar to that of FIGS. 1A-1D and with additional hardware details illustrated—the server computing system(s) and ADIRUMMS system may be implemented using a plurality of hardware components that form electronic circuits suitable for and configured to, when in combined operation, perform at least some of the techniques described herein. In the illustrated embodiment, each server computing system 300 includes one or more hardware central processing units ("CPU") or other hardware processors 305, various input/output ("I/O") components 310, storage 320, and memory 330, with the illustrated I/O components including a display 311, a network connection 312, a computer-readable media drive 313, and other I/O devices 315 (e.g., keyboards, mice or other pointing devices, microphones, speakers, GPS receivers, etc.).

The server computing system(s) 300 and executing ADIRUMMS system 140 may communicate with other computing systems and devices via one or more networks 100 (e.g., the Internet, one or more cellular telephone networks, etc.), such as user client computing devices 360 (e.g., used to supply queries; receive responsive answers; and use the received answer information, such as to display or otherwise present answer information to users of the client computing devices and/or to implement further automated activities, such as to access other functionality provided by the ADIRUMMS system), optionally other external devices 380 (e.g., used to store and provide dwelling information of one or more types), and optionally other computing systems 390.

In the illustrated embodiment, an embodiment of the ADIRUMMS system 140 executes in memory 330 in order to perform at least some of the described techniques, such as by using the processor(s) 305 to execute software instructions of the system 140 in a manner that configures the processor(s) 305 and computing system 300 to perform automated operations that implement those described techniques. The illustrated embodiment of the ADIRUMMS system may include one or more components, not shown, to each perform portions of the functionality of the ADIRUMMS system, and the memory may further optionally execute one or more other programs 335. The ADIRUMMS system 140 may further, during its operation, store and/or retrieve various types of data on storage 320 (e.g., in one or more databases or other data structures), such as various types of user data 328, dwelling data 321 (e.g., textual dwelling description data, images providing image description data, etc.), ML model training data 327a, other ADIRUMMS system data 327b, query segments 153, dwelling vector embeddings 155, query vector embeddings 157, identified target dwellings and optionally associated rankings 159, trained ML model(s) 151, and/or various other types of optional additional information 329.

Some or all of the user client computing devices 360 (e.g., mobile devices), external devices 380, and other computing systems 390 may similarly include some or all of the same types of components illustrated for server computing system 300. As one non-limiting example, the computing devices 360 are each shown to include one or more hardware CPU(s) 361, I/O components 362, and memory and/or storage 369, with a browser and/or ADIRUMMS client program 368 optionally executing in memory to interact with the ADIRUMMS system 140 and present or otherwise use query responses 195 that are received from the ADIRUMMS system for submitted user queries 191. While particular components are not illustrated for the other devices/systems 380 and 390, it will be appreciated that they may include similar and/or additional components.

It will also be appreciated that computing system 300 and the other systems and devices included within FIG. 3 are merely illustrative and are not intended to limit the scope of the present invention. The systems and/or devices may instead each include multiple interacting computing systems or devices, and may be connected to other devices that are not specifically illustrated, including via Bluetooth communication or other direct communication, through one or more networks such as the Internet, via the Web, or via one or more private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable devices, digital music player devices, handheld gaming devices, PDAs, wireless phones, Internet appliances, and various other consumer products that include appropriate communication capabilities. In addition, the functionality provided by the illustrated ADIRUMMS system 140 may in some embodiments be distributed in various components, some of the described functionality of the ADIRUMMS system 140 may not be provided, and/or other additional functionality may be provided.

It will also be appreciated that, while various items are illustrated as being stored in memory or on storage while being used, these items or portions of them may be transferred between memory and other storage devices, such as for purposes of execution, memory management, data integrity, etc. Alternatively, in other embodiments some or all of the software components and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the ADIRUMMS system 140 executing on server computing systems 300) and/or data structures, such as by execution of software instructions of the one or more software programs and/or by storage of such software instructions and/or data structures, and such as to perform algorithms as described in the flow charts and other disclosure herein. Furthermore, in some embodiments, some or all of the systems and/or components may be implemented or provided in other manners, such as by consisting of one or more means that are implemented partially or fully in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

FIG. 4 is a flow diagram of an example embodiment of an ADIRUMMS system routine 400. The routine may be provided by, for example, execution of the ADIRUMMS system 140 of FIGS. 1A-1D, and/or the ADIRUMMS system 140 of FIG. 3, and/or corresponding functionality discussed with respect to FIGS. 2A-2E and elsewhere herein, such as to perform automated operations related to automatically responding to a dwelling-related search query using multiple modes of data including at least free-form natural language text and one or more images by generating and using encoded representations of semantic content of the data of the multiple data modes to identify matching dwellings. In the illustrated embodiment, the routine interacts with a single user at a time to provide dwelling response information to search queries from that user, but it will be appreciated that the routine may interact in a similar manner with multiple users (e.g., sequentially or concurrently), and that the routine may in other embodiments perform similar types of activities for other types of information.

In the illustrated embodiment, the routine 400 begins at 405, where it obtains training data for one or more machine learning (ML) models to encode semantic information of data of multiple modes for real estate-related information, such as positive and negative examples of similarity and dissimilarity, respectively, and trains the ML model(s) using the training data. In block 410, the routine then obtains information about dwellings in one or more geographical areas, such as location, a textual description (e.g., a plurality of keyword-value pairs, a textual narrative regarding the dwelling, etc.), images optionally and other data, etc. In block 415, the routine then generates, for each dwelling and each type of descriptive media (e.g., text, images, video, etc.), one or more vector embeddings using a trained ML model, to encode the semantic representation of contents of that dwelling's description from that type of media. In block 420, the routine then displays a GUI to receive user queries related dwellings and to provide corresponding responses, as well as to optionally provide instructions related to its use.

The routine then proceeds to perform blocks 425-490 to receive and respond to user-provided search queries and optionally other types of instructions and information. In particular, the routine in block 425 waits to receive instructions or other information, and after receiving such instructions or other information, proceeds to block 430 to determine whether the instructions or other information received in block 425 include a search query for dwelling information. If not, the routine continues to block 490, and otherwise continues to block 435 to determine one or more segments in the search query that correspond to associated search criteria and that each represents a separate semantic chunk and/or media type. In block 440, the routine then generates one or more vector embeddings for the query using the trained ML model(s) to encode semantic representations of contents of some or all of the query and optionally of additional information about the user, such as one or more query text vector embeddings, one or more image vector embeddings, and optionally one or more other vector embeddings for other pieces of media of other modes. In block 445, the routine then proceeds to perform the ADIRUMMS Candidate Dwelling Evaluator/Selector routine, and to receive identified target dwellings and optionally relevance rankings—FIG. 5 illustrates one example of such a routine. In block 485, the routine then selects information to provide for some or all of the identified target dwellings, generates a view of the selected dwelling information (optionally using that relevance rankings), and provides a query response with information about the determined dwellings using the generated view.

If it is instead determined in block 430 that the received instructions or other information is not a search query for dwelling information, the routine in block 490 proceeds to perform one or more other indicated operations as appropriate, with non-exclusive examples of such other operations including retrieving and providing previously determined or generated information (e.g., previous user queries, previously determined responses to user queries, etc.), receiving and storing information for later use (e.g., information about dwelling data 321, user data 328, ADIRUMMS system data 327, etc.), responding to other types of search queries (e.g., with data of only a single mode, such as only textual data or only image data, etc.), receiving and using feedback from a user in response to provided query responses in block 485, providing information about how one or more previous query responses were determined, performing housekeeping operations, etc.

After blocks 485 or 490, the routine continues to block 495 to determine whether to continue, such as until an explicit indication to terminate is received (or alternatively only if an explicit indication to continue is received). If it is determined to continue, the routine returns to block 425 to await further information or instructions from the same user (or alternatively to return to block 420 to begin interactions with a different user), and if not continues to block 499 and ends.

FIG. 5 is a flow diagram of an example embodiment of an ADIRUMMS Candidate Dwelling Evaluator/Selector routine 500. The routine may be provided by, for example, execution of the ADIRUMMS Dwelling Evaluator/Selector component 146 of FIGS. 1A-1D and/or a corresponding component (not shown) of the ADIRUMMS system 140 of FIG. 3 and/or with respect to corresponding functionality discussed with respect to FIGS. 2A-2E and elsewhere herein, such as to receive a user query and information generated from it, and to identify target dwellings that match search criteria specified using data of multiple modes. In addition, in at least some situations, the routine 500 may be performed based on execution of block 445 of FIG. 4, with resulting information provided and execution control returning to that location when the routine 500 ends-in other embodiments, the routine may be invoked in other manners. In this example, the routine 500 is performed using particular ways to identify and use multiple matching strategies for different parts of a received search query having data of different modes, but in other embodiments may use other techniques to use multiple matching strategies, whether in addition to or instead of the illustrated types of techniques.

The illustrated embodiment of the routine 500 begins at block 505, where it obtains one or more query vector embeddings for a query and optionally associated query segments (e.g., one or more text vector embeddings, one or more image vector embeddings, optionally one or more other vector embeddings for one or more other types of media, etc.), dwelling vector embeddings for various candidate dwellings (e.g., with each dwelling having one or more text vector embeddings, one or more image vector embeddings, optionally one or more other vector embeddings for one or more other types of media, etc.), optionally associated dwelling data for the candidate dwellings, optionally user data for at least a user who submitted the query, and other ADIRUMMS system data. In block 510, the routine then determines any dwelling type(s) and geographical area(s) specified in the query or otherwise associated with the user who submitted the query, and restricts the candidate dwelling data for the current query to the determined dwelling type(s) and geographical area(s), if any, or otherwise selects all dwellings as candidate dwellings. In block 515, the routine then determines similarities between the query image vector embedding(s) and dwelling image vector embeddings for the candidate dwellings to identify dwellings with image vector embeddings within a first similarity threshold (e.g., a measured distance between vector embeddings below a first distance-based threshold) to query image vector embedding(s), and adds identified dwellings to a first group of dwellings. In block 520, the routine then determines similarities between the query text vector embedding (s) and dwelling text vector embeddings for the candidate dwellings to identify dwellings with text vector embeddings within a second similarity threshold to query text vector embedding(s), and adds identified dwellings to a second group of dwellings. In block 525, the routine then optionally identifies a third group of candidate dwellings that otherwise match the query, such as to determine and use similarities within a third similarity threshold between vector embedding(s) of the query and candidate dwellings for other media types and/or of dissimilar media types, and/or to directly compare text in the query text segments (e.g., one or more keywords each optionally having one or more associated values, a natural language phrase, etc., including to optionally consider alternative phrases using synonyms and/or stemming and/or lemmatization) and/or generated textual descriptions of the query image(s) to dwellings' textual data to identify matches, etc. In other embodiments, the query may instead be represented with a single query vector embedding that encodes data of multiple modes from the query, and may be matched to corresponding dwelling vector embeddings that similarly each represents a dwelling and encodes data of multiple modes for that dwelling. In block 530, the routine optionally directly compares text in the query text segments (e.g., one or more keywords each optionally having one or more associated values, a natural language phrase, etc., including to optionally consider alternative phrases using synonyms and/or stemming and/or lemmatization) and/or generated textual descriptions of the query image(s) to dwelling textual data to identify dwellings with matching textual data, and add identified dwellings (if any) to the third group of dwellings. In block 535, the routine then combines identified dwellings of the first, second and third groups to generate dwelling rankings or other dwelling ordering based on at least in part on similarity to the query (e.g., using inter-vector distances and/or matching certainties and/or other factors, using a trained ML model, etc.) and/or other factors (e.g., using user-specific data, increasing weighting for dwellings present in multiple or all groups, etc.), and selects one or more ranked or otherwise ordered dwellings as being target dwellings that are identified to match the query, such as based on the associated rankings or other orderings—in at least some embodiments and situations, the selected dwellings may include those present in all of the first, second and third dwelling groups (e.g., an intersection), while in other embodiments and situations may include other dwellings, such as those present in at least two of the three dwelling groups or alternatively in only one of the three dwelling groups. The identified target dwellings and any associated relevance rankings are then provided as output in block 590, and the routine then continues to block 599 and returns, such as to return to the flow of FIG. 4 at block 445 if invoked from there.

Figure 6:
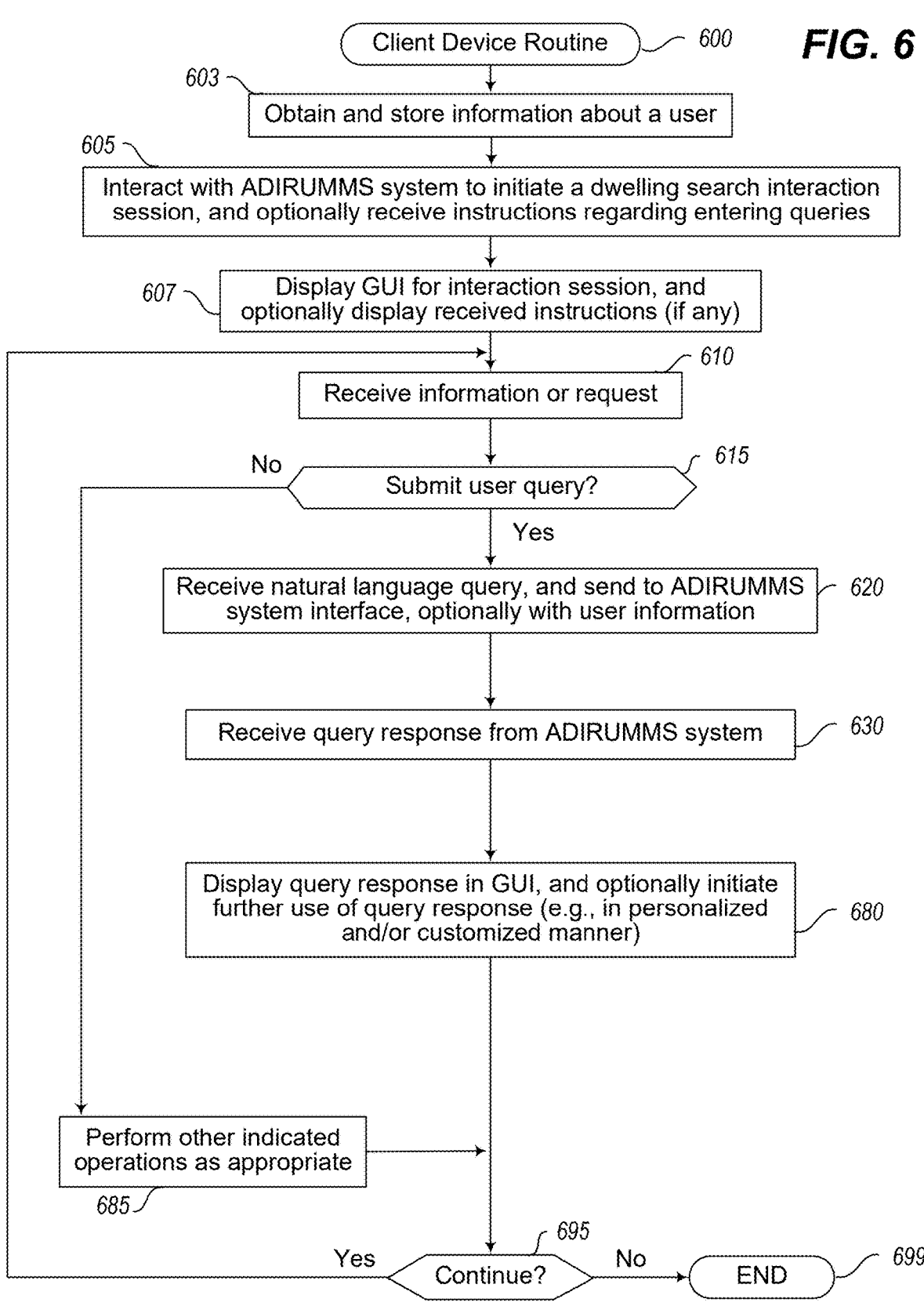
FIG. 6 illustrates a flow diagram of an example embodiment of a client device routine.

FIG. 6 is a flow diagram of an example embodiment of a client device routine 600. The routine may be provided by, for example, operations of a client computing device 360 of FIGS. 1A-1D and/or a client computing device 360 of FIG. 3 and/or with respect to corresponding functionality discussed with respect to FIGS. 2A-2E and elsewhere herein, such as to interact with users or other entities who submit queries (or other information) to the ADIRUMMS system, to receive responsive answers (or other information) from the ADIRUMMS system, and to optionally use the received information in one or more manners (e.g., to automatically initiate follow-up activities in accordance with a received responsive answer).

The illustrated embodiment of the routine 600 begins at block 603, where information is optionally obtained and stored about the user, such as for later use in personalizing or otherwise customizing further actions to that user. The routine then continues to block 605 to interact with the ADIRUMMS system to initiate an interaction session (e.g., in response to a corresponding instruction from the user), as well as to optionally receive a greeting and/or introductory instructions regarding using a GUI of the ADIRUMMS system. In block 607, the routine then displays a GUI for the interaction session, and optionally displays the received greeting and/or introductory instructions, if any. The routine then continues to perform blocks 610-680 as part of participating in the interaction session.

In particular, the routine continues to block 610 after block 607, where it waits until information or a request is received from the user. In block 615, the routine determines if the information or request received in block 610 is a search query to submit, such as text in a natural language format (e.g., freeform text) and/or data of one or more other modes (e.g., one or more images, one or more videos, one or more audio clips, etc.), and if not continues to block 685. Otherwise, the routine continues to block 620, where it sends the received query to the ADIRUMMS system interface, optionally along with additional information about the user from block 603, to obtain a corresponding responsive answer in block 630—in other embodiments, the routine may further modify the received user query to personalize and/or customize the information to be provided to the ADIRUMMS system (e.g., to add information specific to the user, such as location, demographic information, preference information, etc.). In block 680, the routine then displays the received query response in the GUI, and optionally initiates further use of the query response in one or more manners (e.g., in a manner that is personalized and/or customized for the user)—in some embodiments, the further initiated activities may include invoking of other functionality of the ADIRUMMS system, such as to initiate an inspection process for a selected dwelling indicated in dwelling information search results, to initiate a mortgage application process for a selected dwelling indicated in dwelling information search results, to initiate matching the user with a real estate professional as part of a housing search based on corresponding response information received from the ADIRUMMS system, etc.

In block 685, the routine instead performs one or more indicated operations as appropriate other than receiving and submitting a query, with non-exclusive examples including sending information to the ADIRUMMS system of other types, receiving and storing user data for later use in personalization and/or customization activities, receiving and responding to requests for information about previous user queries and/or corresponding responsive answers for a current user and/or client device, receiving and responding to indications of one or more housekeeping activities to perform, etc. After blocks 680 or 685, the routine continues to block 695 to determine whether to continue, such as until an explicit indication to terminate is received (or alternatively only if an explicit indication to continue is received). If it is determined to continue, the routine returns to block 610, and if not continues to block 699 and ends.

It will be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, synchronously or asynchronously, etc.) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the claims that are specified and the elements recited therein. In addition, while certain aspects of the invention may be presented at times in certain claim forms, the inventors contemplate the various aspects of the invention in any available claim form. For example, while only some aspects of the invention may be recited at a particular time as being embodied in a computer-readable medium, other aspects may likewise be so embodied.

What is claimed is:

1. A system comprising:

one or more hardware processors of one or more computing devices; and one or more memories with stored instructions that, when executed by at least one of the one or more hardware processors, cause at least one computing device of the one or more computing devices to perform automated operations including at least:

generating, for a plurality of dwellings that each has an associated textual description and multiple associated images of portions of that dwelling, and using one or more machine learning models that are trained to capture at least one of semantic relationships between words or semantic content of images and to convert high-dimensional data into low-dimensional vectors that preserve data content, respective vector-based embeddings that represent the plurality of dwellings, wherein the vector-based embeddings include, for each of the plurality of dwellings, a dwelling text vector-based embedding that represents semantic content from the associated textual description of that dwelling, and one or more dwelling image vector-based embeddings that each encodes a semantic representation of contents of one or more of the multiple associated images for that dwelling;

generating, by a client device that is one of the one or more computing devices, and in response to a request received from a user of the client device for information about target dwellings that satisfy multiple specified search criteria, a user query that includes the multiple search criteria and that further includes automatically added information about a determined geographical location of the client device, the multiple search criteria including a textual dwelling characterization specified using a sequence of freeform terms, and further including one or more indicated images depicting one or more representative dwelling portions;

receiving the user query from the client device;

generating, using the one or more trained machine learning models, multiple additional vector-based embeddings for the user query that represent further semantic content of at least some of the user query, the multiple additional vector-based embeddings including a query text vector-based embedding that represents semantic content from at least some of the textual dwelling characterization, and including one or more query image vector-based embeddings that each represents semantic content from at least one of the one or more indicated images;

determining at least one target dwelling of the plurality of dwellings that is located in one or more geographical areas associated with the determined geographical location and that satisfies the multiple search criteria, including determining for each of the at least one target dwellings that the respective dwelling text vector-based embedding for that target dwelling matches the query text vector-based embedding for the user query, and further determining that, for each of the one or more query image vector-based embeddings, each of the at least one target dwellings has at least one respective dwelling image vector-based embedding that matches that query image vector-based embedding for the user query; and providing, in response to the user query, information about the determined at least one target dwelling.

2. The system of claim 1 wherein the determining that a dwelling text vector-based embedding for a target dwelling matches the query text vector-based embedding includes determining that that dwelling text vector-based embedding differs from that query text vector-based embedding by at most a first defined threshold amount, and wherein the determining that a dwelling image vector-based embedding for a target dwelling matches a query image vector-based embedding includes determining that that dwelling text vector-based embedding differs from that query image vector-based embedding by at most a second defined threshold amount.

3. The system of claim 2 wherein the first and second defined threshold amounts are a same amount, and wherein the determining that a dwelling text vector-based embedding differs from a query text vector-based embedding by at most a first defined threshold amount and the determining that a dwelling text vector-based embedding differs from a query image vector-based embedding by at most a second defined threshold amount includes measuring a distance between a pair of vector-based embeddings and determining that the measured distance is below a defined distance-based threshold.

4. The system of claim 1 wherein the associated textual description for each of the plurality of dwellings includes a textual narrative describing that dwelling using freeform text and includes a plurality of keyword-value pairs to describe attributes of that dwelling, and wherein the stored instructions include software instructions that, when executed by the one or more hardware processors, cause the one or more computing devices to perform the generating, for each of the plurality of dwellings, of the respective dwelling text vector-based embedding for that dwelling to encode a semantic representation of contents of at least the textual narrative and the plurality of keyword-value pairs included in the textual description for that dwelling.

5. The system of claim 1 wherein the providing of the information about the determined at least one target dwelling includes presenting the information about the determined at least one target dwelling in a displayed graphical user interface.

6. The system of claim 1 wherein the dwelling text vector-based embedding for each of the plurality of dwellings further encodes a further semantic representation of contents of additional information about that dwelling obtained from one or more public sources of data about dwellings, and wherein the textual dwelling characterization of the user query includes text matching the additional information for one or more of the at least one target dwellings.

7. The system of claim 1 wherein the multiple associated images for each of the at least one target dwellings include at least one image of a first type that shows a ground-level view of an exterior of at least one side of that target dwelling and at least one image of a second type that shows an overhead view including all of that target dwelling and at least one image of a third type that shows an interior view of at least one room of that target dwelling, wherein the generated respective vector-based embeddings for the plurality of dwellings includes, for each of the target dwellings, a separate dwelling image vector-based embedding for each of the multiple associated images for that target dwelling that is generated using the one or more trained machine learning models, wherein the multiple search criteria of the user query include multiple indicated images of at least two of the first and second and third types, wherein the generating of the one or more query image vector-based embeddings includes generating, using the one or more trained machine learning models, a separate query image vector-based embedding for each of the multiple indicated images, and wherein the determining of the at least one target dwelling includes determining that each target dwelling has, for each separate query image vector-based embedding, one or more dwelling image vector-based embeddings that differs from that separate query image vector-based embedding by at most a defined threshold amount.

8. The system of claim 1 wherein the automated operations further include, for each of the at least one target dwellings, generating, for each of the multiple associated images of that target dwelling and using the one or more trained machine learning models, a respective textual description of contents of that associated image, and wherein the determining of the at least one target dwelling further includes determining that each target dwelling has at least one associated image whose respective textual description matches at least some of the textual dwelling characterization.

9. The system of claim 1 wherein the at least one target dwellings each further has an associated video showing at least some of that dwelling, wherein at least one dwelling image vector-based embeddings for each of the at least one target dwellings each encodes a semantic representation of contents of multiple image frames from the associated video for that target dwelling, and wherein the determining of the at least one target dwelling includes determining, for each of the at least one target dwellings, that the at least one dwelling image vector-based embedding for that target dwelling differs from one of the one or more query image vector-based embeddings by at most a defined threshold amount.

10. The system of claim 1 wherein the received user query includes a video with a plurality of image frames, and wherein the automated operations further include selecting at least one of the plurality of image frames to be the one or more indicated images.

11. The system of claim 1 wherein the at least one target dwellings each further has one or more additional associated pieces of media of one or more other media types different from images and text, wherein the generated respective vector-based embeddings further includes, for each of the at least one target dwellings, one or more further dwelling media vector-based embeddings for each of the one or more additional pieces of media associated with that dwelling that encodes a further semantic representation of contents of that additional piece of media and that are generated using the one or more trained machine learning models, wherein the multiple search criteria further include at least one additional indicated piece of media of at least one of the one or more other media types, wherein the multiple additional vector-based embeddings for the user query include an additional query media vector-based embedding for each of the at least one additional indicated pieces of media that is generated using the one or more trained machine learning models, and wherein the determining of the at least one target dwelling further includes determining for each of the at least one target dwellings that the associated one or more additional pieces of media for that target dwelling match the at least one additional indicated pieces of media by each having, for each of the at least one additional indicated pieces of media, at least one dwelling media vector-based embedding that differs from the query media vector-based embedding for that indicated piece of media by at most a defined threshold amount.

12. The system of claim 1 wherein the generating of the multiple additional vector-based embeddings for the user query further includes obtaining additional information specific to a user that supplies the user query, and further encoding a further semantic representation in at least one of the multiple additional vector-based embeddings of contents of the additional information specific to the user.

13. The system of claim 1 wherein the user query is received from a client device, wherein the providing of the information about the determined at least one target dwelling includes transmitting search results that include the information about the determined at least one target dwelling over one or more computer networks to the client device for display on the client device, and wherein the automated operations further include, before the generating of the respective vector-based embeddings for the plurality of dwellings, training the one or more machine learning models using at least one of positive examples each having two or more first real estate phrases that are semantically similar and negative examples each having two or more second real estate phrases that are not semantically similar, or positive examples each having two or more first real estate images that are similar and negative examples each having two or more second real estate images that are not similar.

14. A non-transitory computer-readable medium having stored contents that cause one or more computing devices to perform automated operations, the automated operations including at least:

generating, by the one or more computing devices, and using one or more machine learning models that are trained to capture at least one of semantic relationships between words or semantic content of images and to convert high-dimensional data into low-dimensional vectors that preserve data content, vector-based embeddings for a plurality of buildings each having an associated textual description and multiple associated images of portions of that building, wherein the vector-based embeddings include, for each of the plurality of buildings, one or more building vector-based embeddings that encode semantic information of at least some of the associated textual description for that building and semantic information of contents of one or more of the multiple associated images for that building;

receiving, by the one or more computing devices and after the generating of the vector-based embeddings for the plurality of buildings, a user query from a client device for information about target buildings that satisfy multiple specified search criteria, the multiple search criteria including a textual building characterization specified using a sequence of freeform terms and further including one or more indicated images depicting one or more representative building portions and further including a geographical location determined and supplied by the client device;

generating, by the one or more computing devices and using the one or more trained machine learning models, one or more query vector-based embeddings for the user query that encode semantic information of at least some of the textual building characterization and semantic information of contents of at least one of the one or more indicated images;

determining, by the one or more computing devices, at least one target building of the plurality of buildings for the user query that is located in one or more geographical areas associated with the geographical location, including determining that building vector-based embeddings for the at least one target buildings match the one or more query vector-based embeddings for the user query; and providing, by the one or more computing devices and in response to the user query, information about the determined at least one target building.

15. The non-transitory computer-readable medium of claim 14 wherein the generating of the vector-based embeddings for the plurality of buildings further includes generating, for each of the plurality of buildings and using the one or more trained machine learning models, a building text vector-based embedding that encodes a semantic representation of contents of at least some of the associated textual description for that building, and one or more building image vector-based embeddings that each encodes a semantic representation of contents of one or more of the multiple associated images for that building, wherein the generating of the one or more query vector-based embeddings for the user query further includes generating, using the one or more trained machine learning models, a query text vector-based embedding that encodes a semantic representation of contents of at least some of the textual building characterization, and one or more query image vector-based embeddings that each encodes a semantic representation of contents of at least one of the one or more indicated images, and wherein the determining that building vector-based embeddings for the at least one target buildings match the one or more query vector-based embeddings includes determining that building text vector-based embeddings for the at least one target buildings differ from that query text vector-based embedding by at most a defined threshold amount, and that building image vector-based embeddings for the at least one target buildings differ from the one or more query image vector-based embeddings by at most the defined threshold amount.

16. The non-transitory computer-readable medium of claim 15 wherein the stored contents include software instructions that, when executed by the one or more computing devices, cause the one or more computing devices to perform the automated operations and further perform, before the generating of the vector-based embeddings for the plurality of dwellings, training the one or more machine learning models using at least one of positive examples each having two or more first real estate phrases that are semantically similar and negative examples each having two or more second real estate phrases that are not semantically similar, or positive examples each having two or more first real estate images that are similar and negative examples each having two or more second real estate images that are not similar, wherein the determining of the at least one target building includes determining multiple target buildings, wherein the determining that building text vector-based embeddings for the at least one target buildings differ from that query text vector-based embedding by at most a defined threshold amount includes determining that one or more of the multiple target buildings each has an associated building text vector-based embedding that differs from the query text vector-based embedding by at most a defined distance using a defined distance metric, and wherein the determining that building image vector-based embeddings for the at least one target buildings differ from the one or more query image vector-based embeddings by at most the defined threshold amount includes determining that at least one of the multiple target buildings each has an associated building image vector-based embedding that differs from one of the query image vector-based embeddings by at most the defined distance using the defined distance metric.

17. A computer-implemented method comprising:

generating, by one or more computing devices using one or more machine learning models that are trained to capture at least one of semantic relationships between words or semantic content of images and to convert high-dimensional data into low-dimensional vectors that preserve data content, vector-based embeddings for a plurality of dwellings in one or more geographical areas, wherein each of the dwellings has an associated textual description and multiple associated images of portions of that dwelling, and wherein the vector-based embeddings include, for each of the plurality of dwellings, a dwelling text vector-based embedding that encodes a semantic representation of contents of at least some of the associated textual description for that dwelling, and one or more dwelling image vector-based embeddings that each encodes a semantic representation of contents of one or more of the multiple associated images for that dwelling;

receiving, by the one or more computing devices and after the generating of the vector-based embeddings for the plurality of dwellings, a user query from a client device for information about target dwellings that are in at least one of the one or more geographical areas including a geographical location supplied by the client device and that satisfy multiple specified search criteria, the multiple search criteria including a textual dwelling characterization specified using a sequence of freeform terms submitted via a natural language interface, and further including one or more indicated images depicting one or more representative dwelling portions;

generating, by the one or more computing devices using the one or more trained machine learning models, multiple additional vector-based embeddings for the user query that encode additional semantic representations of the user query, the multiple additional vector-based embeddings including a query text vector-based embedding that encodes a semantic representation of contents of at least some of the textual dwelling characterization, and one or more query image vector-based embeddings that each encodes a semantic representation of contents of at least one of the one or more indicated images;

determining, by the one or more computing devices, one or more first dwellings of the plurality of dwellings that are located in the one or more geographical areas and whose associated textual descriptions match the textual dwelling characterization by each having a dwelling text vector-based embedding that differs from the query text vector-based embedding by at most a first defined threshold amount;

determining, by the one or more computing devices, one or more second dwellings of the plurality of dwellings that are located in the one or more geographical areas and whose associated images match the one or more indicated images by each having at least one dwelling image vector-based embedding that differs from at least one query image vector-based embedding by at most a second defined threshold amount;

determining, by the one or more computing devices, at least one target dwelling of the plurality of dwellings that satisfies the multiple search criteria, including identifying that the at least one target dwelling is part of both the one or more first dwellings and the one or more second dwellings; and presenting, by the one or more computing devices, information about the determined at least one target dwelling as part of response information to the user query.

18. The computer-implemented method of claim 17 wherein the determining of the one or more first dwellings includes measuring, for each of the dwelling text vector-based embeddings of the one or more first dwellings, a first distance between the query text vector-based embedding and that dwelling text vector-based embedding that is below a first distance-based threshold, and wherein the determining of the one or more second dwellings includes measuring, for each of the at least one dwelling image vector-based embeddings of the one or more second dwellings, a second distance between one of the query image vector-based embeddings and that dwelling image vector-based embedding that is below a second distance-based threshold.

19. The computer-implemented method of claim 18 wherein the first and second defined threshold amounts are a same amount, wherein the first and second distance-based thresholds are a same distance, and wherein the method further comprises, before the generating of the vector-based embeddings for the plurality of dwellings, training the one or more machine learning models using at least one of positive examples each having two or more first real estate phrases that are semantically similar and negative examples each having two or more second real estate phrases that are not semantically similar, or positive examples each having two or more first real estate images that are similar and negative examples each having two or more second real estate images that are not similar.

20. The computer-implemented method of claim 17 wherein the generating of the multiple additional vector-based embeddings for the user query further includes obtaining additional information specific to a user that supplies the user query, and further encoding a further semantic representation in at least one of the multiple additional vector-based embeddings of contents of the additional information specific to the user.

21. The computer-implemented method of claim 17 wherein the presenting of the information about the determined at least one target dwelling includes transmitting, by the one or more computing devices, search results that include the information about the determined at least one target dwelling over one or more computer networks to the client device for display on the client device.

22. The computer-implemented method of claim 17 wherein the associated textual description for each of the plurality of dwellings includes a plurality of keyword-value pairs to describe attributes of that dwelling and a textual narrative describing that dwelling using freeform text, wherein the textual dwelling characterization further includes a further textual description and one or more keywords each having one or more associated values, wherein the query text vector-based embedding encodes the semantic representation of the contents of at least the further textual dwelling description, and wherein the determining of the one or more first dwellings further includes determining, for each of the one or more first dwellings, that the plurality of keyword-value pairs in the associated textual description for that first dwelling matches the one or more keywords and associated values of the textual dwelling characterization.

23. The computer-implemented method of claim 17 wherein the multiple search criteria further include an indicated type of dwelling and the geographical location, and wherein the method further comprises restricting the plurality of dwellings considered for the first and second dwellings to dwellings of the indicated type of dwelling.

24. A computer-implemented method comprising:

training, by one or more computing devices, a first machine learning model to capture semantic relationships between words and a second machine learning model to capture semantic content of images, including using positive examples each having two or more first real estate phrases that are semantically similar and using negative examples each having two or more second real estate phrases that are not semantically similar for the training of the first machine learning model, and using examples each having an image and one or more associated textual labels for the training of the second machine learning model;

obtaining, by the one or more computing devices, respective descriptive information for a plurality of dwellings in a geographical area, wherein the respective descriptive information for each dwelling includes an associated textual description with a plurality of keyword-value pairs and with a textual narrative describing that dwelling using freeform text, and further includes multiple associated images of portions of that dwelling, and further includes one or more other pieces of media of one or more other media types different from images and text;

analyzing, by the one or more computing devices and for each of the plurality of dwellings, the one or more other pieces of media for that dwelling to generate at least one further textual description of at least one other piece of media and to generate one or more further images having content corresponding to at least one other piece of media;

generating, by the one or more computing devices and using the first trained machine learning model, a dwelling textual vector-based embedding for each of the plurality of dwellings that encodes a semantic representation of contents of at least some of the associated textual description for that dwelling and of contents of the at least one further textual description for that dwelling;

generating, by the one or more computing devices and using the second trained machine learning model, multiple dwelling textual vector-based embeddings for each of the plurality of dwellings that each encodes a semantic representation of contents of one of the multiple associated images for that dwelling or of one of the one or more further images for that dwelling;

receiving, by the one or more computing devices and after the generating of the dwelling textual vector-based embedding and the multiple vector-based embeddings for each of the plurality of dwellings, a user query from a client device for information about target dwellings that satisfy multiple specified search criteria, the multiple search criteria including a textual dwelling characterization specified using a sequence of freeform terms submitted via a natural language interface, and further including one or more indicated images depicting one or more representative dwelling portions, and further including a geographical location determined and supplied by the client device;

generating, by the one or more computing devices and using the first and second trained machine learning models, multiple additional vector-based embeddings for the user query that encode additional semantic representations of the user query, the multiple additional vector-based embeddings including a query text vector-based embedding that encodes a semantic representation of contents of at least some of the textual dwelling characterization, and one or more query image vector-based embeddings that each encodes a semantic representation of contents of one of the one or more indicated images;

determining, by the one or more computing devices, one or more first dwellings of the plurality of dwellings that are located in one or more geographical areas associated with the geographical location and that each has a dwelling text vector-based embedding differing from the query text vector-based embedding by at most a first defined threshold amount;

determining, by the one or more computing devices, one or more second dwellings of the plurality of dwellings that are located in the one or more geographical areas and that each has, for each of the one or more query image vector-based embeddings, at least one dwelling image vector-based embedding differing from that query image vector-based embedding by at most a second defined threshold amount;

determining, by the one or more computing devices, at least one target dwelling of the plurality of dwellings that satisfies the multiple search criteria, including identifying that the at least one target dwelling is part of both the one or more first dwellings and the one or more second dwellings; and presenting, by the one or more computing devices and in a displayed graphical user interface, information about the determined at least one target dwelling as part of response information to the user query.

25. The computer-implemented method of claim 24 wherein the multiple search criteria further include one or more additional indicated pieces of media of at least one of the one or more other media types, and wherein the method further comprises:

generating, by the one or more computing devices and for each of the plurality of dwellings, one or more further dwelling media vector-based embeddings for each of the one or more other pieces of media for that dwelling that encodes a further semantic representation of contents of that other piece of media;

generating, by the one or more computing devices and for each of the one or more additional indicated pieces of media, an additional query media vector-based embed-
ding that encodes an additional semantic representation
of contents of that additional indicated piece of media;
and determining, by the one or more computing devices, one
or more third dwellings of the plurality of dwellings
each having, for each of the one or more additional
indicated pieces of media, at least one dwelling media
vector-based embedding that differs from the additional
query media vector-based embedding for that additional indicated piece of media by at most a third
defined threshold amount, and wherein the determining of the at least one target
dwelling of the plurality of dwellings that satisfies the
multiple search criteria further includes identifying that
the at least one target dwelling is further part of the one
or more third dwellings.

26. The computer-implemented method of claim 24
wherein the generating of the multiple additional vector-
based embeddings for the user query further includes obtaining additional information specific to a user who supplies the
user query that is not included in the user query, and further
encoding a further semantic representation in at least one of
the multiple additional vector-based embeddings of contents
of the additional information specific to the user.

* * * * *